United States Patent
Khosrowshahi et al.

(10) Patent No.: US 11,929,975 B2
(45) Date of Patent: Mar. 12, 2024

(54) MESSAGE SUGGESTIONS IN A GROUP-BASED COMMUNICATION PLATFORM

(71) Applicant: Salesforce, Inc., San Francisco, CA (US)

(72) Inventors: Farzad Khosrowshahi, Weehawken, NJ (US); Michael Hahn, San Francisco, CA (US); Ryan Featherman, San Francisco, CA (US); Chaitanya Ravula, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/538,973

(22) Filed: Nov. 30, 2021

(65) Prior Publication Data
US 2023/0171220 A1    Jun. 1, 2023

(51) Int. Cl.
H04L 51/48    (2022.01)
G06F 3/0484    (2022.01)
H04L 51/52    (2022.01)
H04L 51/56    (2022.01)

(52) U.S. Cl.
CPC ............ *H04L 51/48* (2022.05); *G06F 3/0484* (2013.01); *H04L 51/52* (2022.05); *H04L 51/56* (2022.05)

(58) Field of Classification Search
None
See application file for complete search history.

(56) References Cited

U.S. PATENT DOCUMENTS

| 7,130,885 B2 * | 10/2006 | Chandra | G06Q 10/107 709/224 |
| 10,467,334 B1 * | 11/2019 | Lowell | G06F 16/93 |
| 10,503,748 B1 * | 12/2019 | Farrow | G06F 16/245 |

(Continued)

OTHER PUBLICATIONS

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

*Primary Examiner* — Mandrita Brahmachari
(74) *Attorney, Agent, or Firm* — Lee & Hayes, P.C.

(57) ABSTRACT

Techniques for providing a suggested message to a user of a communication platform are described herein. The communication platform can receive a request, from a first user, to suggest a message (e.g., suggested message) to a second user with whom the first user is connected via the communication platform. The request can include contents of the suggested message and a user identifier associated with the second user. In some examples, the request can additionally include a suggested virtual space via which the suggested message is to be published, a suggested time for delivery, and/or the like. The communication platform can cause a presentation of the suggested message to the second user, such as via a user interface. In response to receiving an approval of the suggested message via the user interface, the communication platform can cause a publication thereof in association with a user account of the second user.

20 Claims, 9 Drawing Sheets

(56) References Cited

U.S. PATENT DOCUMENTS

| | | | | |
|---|---|---|---|---|
| 10,810,361 | B1* | 10/2020 | Venkatraman | H04L 63/0421 |
| 11,621,936 | B2* | 4/2023 | Khosrowshahi | H04L 51/046 |
| | | | | 715/753 |
| 2002/0138582 | A1* | 9/2002 | Chandra | G06Q 10/107 |
| | | | | 709/206 |
| 2004/0003038 | A1* | 1/2004 | Huang | G06F 16/40 |
| | | | | 709/204 |
| 2006/0168043 | A1* | 7/2006 | Eisenberger | G16H 70/40 |
| | | | | 709/204 |
| 2009/0012853 | A1* | 1/2009 | Nolet | G06Q 30/02 |
| | | | | 705/14.69 |
| 2011/0181906 | A1* | 7/2011 | Grueneberg | G06F 3/1275 |
| | | | | 358/1.15 |
| 2012/0089687 | A1* | 4/2012 | Katz | G06Q 30/0241 |
| | | | | 709/206 |
| 2013/0132191 | A1* | 5/2013 | Galai | G06Q 30/0251 |
| | | | | 705/14.49 |
| 2013/0318589 | A1* | 11/2013 | Ford | H04L 63/10 |
| | | | | 726/7 |
| 2014/0147823 | A1* | 5/2014 | Wolfe | G09B 5/08 |
| | | | | 434/350 |
| 2016/0381073 | A1* | 12/2016 | Brunn | H04L 63/20 |
| | | | | 726/1 |
| 2018/0287982 | A1 | 10/2018 | Draeger et al. | |
| 2021/0279246 | A1* | 9/2021 | Morrison | G06F 16/252 |
| 2022/0337537 | A1* | 10/2022 | Lewis | G06F 40/166 |
| 2022/0400139 | A1* | 12/2022 | Walling | H04L 67/53 |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims To Cut US All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield On How Slack Became A $2.8 Billion Unicorn", Forbes, [online] [retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

MESSAGE SUGGESTIONS IN A GROUP-BASED COMMUNICATION PLATFORM

TECHNICAL FIELD

A communication platform can leverage a network-based computing system to enable users to exchange data. In an example, users of the communication platform can communicate with other users via channels, direct messages, and/or other virtual spaces. A channel, direct message, and/or other virtual space can be a data route used for exchanging data between and among systems and devices associated with the communication platform. For example, a channel may be established between and among various user computing devices (e.g., clients), allowing the user computing devices to communicate and share data between and among each other over one or more networks. That is, in some examples, the communication platform can be a channel-based platform and/or hub for facilitating communication between and among users. In some examples, data associated with a channel, a direct message, and/or other virtual space can be presented via a user interface. The data can include message objects, such as text, file attachments, emojis, and/or the like that are each posted by individual members of a virtual space. That is, each message object may be presented in association with a sending user identifier associated with the user who drafted and posted the message object via the virtual space.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

DETAILED DESCRIPTION

Figure 1:
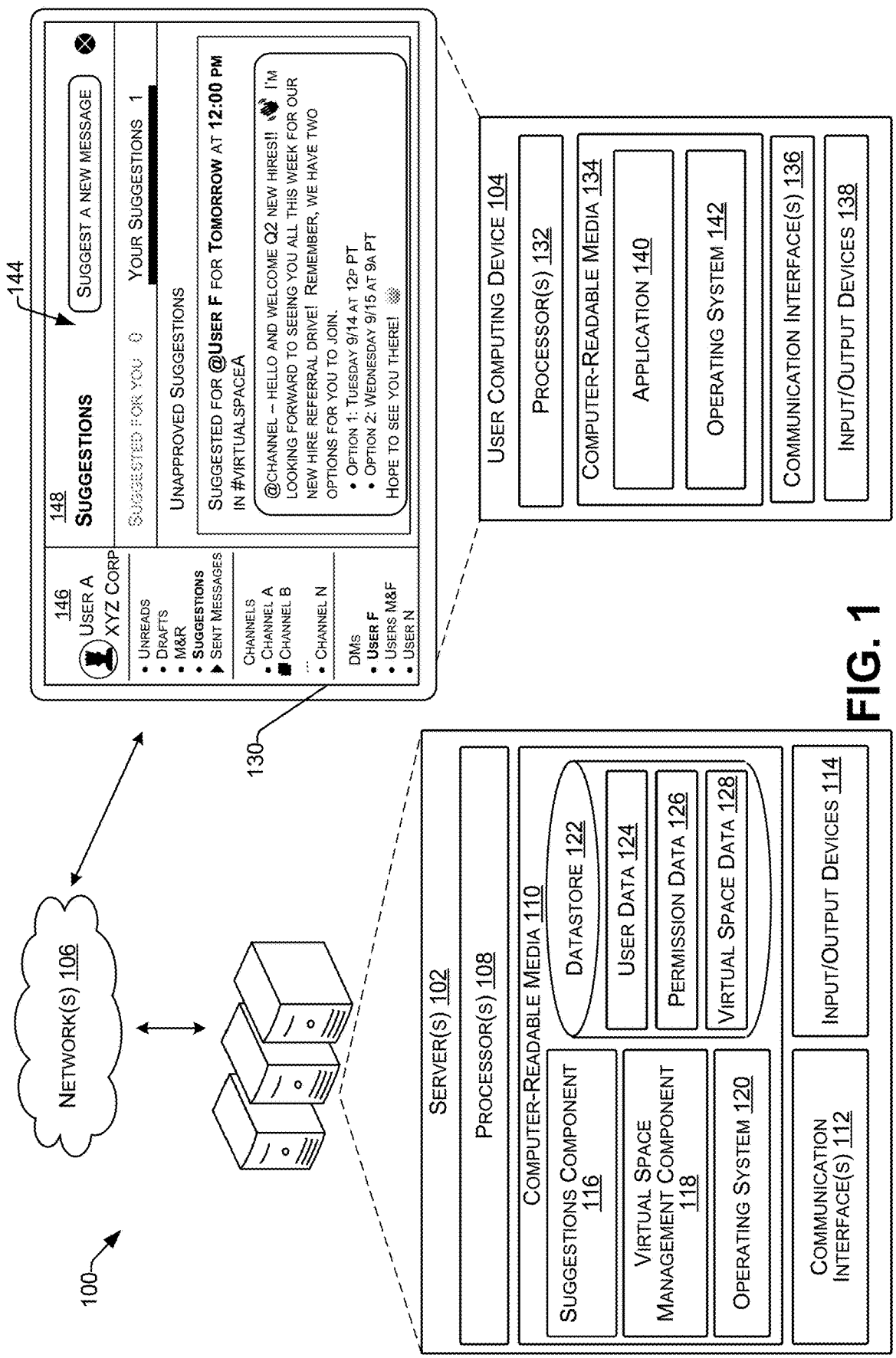
FIG. 1 illustrates an example environment for performing techniques described herein.

Techniques for facilitating a suggested message drafted in association with a first user account of a communication platform to be published in association with a second user account of the communication platform are described herein. The communication platform, which, in some examples can be a group-based communication platform, a channel-based communication platform, a permission-based communication platform, a channel-based messaging platform, and/or any other platform for facilitating communication between and among users, can enable users to exchange messages and/or other data via the communication platform. In at least one example, a first user can draft a message (e.g., text, images, emojis, audio and/or video files, GIFs, etc.) and post the message directly to a virtual space (e.g., a channel, direct message, board, etc.) of the communication platform. That is, the message can be published in association with the virtual space as originating from the first user. In some examples, the first user may recognize that the message may have more of an impact on the recipients if the message is posted in association with a second user account. For example, an executive's assistant may draft a message for publication by the executive. As another example, the first user may be enlisted to assist one or more other users by providing message content. For instance, a social media or marketing agent of a company may suggest marketing messages to be sent by other employees of the company.

In existing technologies, to suggest a message for another user to publish, a first user (e.g., the executive's assistant) can draft a suggested message for a second user (e.g., the executive) and can send the suggested message to the second user embedded in a direct message, email, text message or other means of communication between the first user and the second user. The second user can then open another virtual space via which the suggested message is to be sent, copy and paste the suggested message into a new message, make edits, and send the message via the virtual space. If the second user requests a second look at the edited message, however, the second user must re-open the means of communication between the first user and the second user, paste the edited message into another message, and send it to the first user. The first user and the second user can send a plurality of messages back and forth until settling on a finalized message for publication. As such, in existing technologies, the process of suggesting a message is inefficient, time and resource consuming, is prone to introducing errors, and can lead to negative user experiences and potentially a loss of valuable information, such as in the copy/paste interactions.

Techniques described herein provide an efficient means by which the first user can provide a suggested message to a second user, that the second user can then quickly and easily approve for publication. For instance, the first user can input a message into a composition user interface associated with a virtual space and select an option to suggest the message to a second user for publication via the virtual space. The message (e.g., suggested message, message with annotated suggestions), as described herein, can refer to any electronically generated digital object, provided by a user using a client associated with the communication platform, that is configured for display within a channel, direct message, and/or other virtual space of the communication platform for facilitating communications as described herein. A message can include any text, image, video, audio, or combination thereof provided by a user (using a client). For instance, a message can include text, as well as an image and/or a video, as message contents.

In some examples, in response to receiving a selection of the option to suggest a message, the communication platform can request additional data from the first user, to associate with the suggested message. The additional data can include one or more virtual spaces (e.g., workspaces, channels, direct messaging instances, documents, etc.) via which the suggested message would be published, a suggested date and/or time for publication, a note to the second user explaining the reason for suggesting the message, and/or the like. In response to receiving the message and/or the additional data, the communication platform can send the suggested messages to a second user and cause a presentation of the suggested message via a suggestions interface associated with a second user account of the second user. In at least one example, the communication platform can cause selectable controls to accept, decline, and/or edit the suggested message to be presented in association with the suggested message. That is, the communication platform can provide a means by which the second user can quickly and efficiently review and edit and/or approve (or decline) the suggested message to be published in association with the second user account without having to copy and paste the message in other forums, which helps preserve data security.

Additionally or alternatively, the first user can input the suggested message and/or the additional data in a first instance of the suggestions interface. In such examples, the suggestions interface may expedite the process of drafting and sending the suggested message to the second user account. In response to receiving the input of a suggested message and/or additional data associated therewith via a first instance of the suggestions interface, the communication platform can cause the suggested message to be presented via a second suggestions interface associated with the second user account. In some examples, the first instance of the suggestions interface can include a status of the suggested message (e.g., unapproved, denied, approved, pending send, sent, etc.). In such examples, the first instance of the suggestions interface can provide a means by which the first user can receive real-time or near real-time updates associated with the status of the suggested message, thereby negating a need to send query or reminder messages to the first user regarding the suggested message. As such, the suggestions interface described herein may reduce a total number of messages (e.g., amount of data) stored in association with the first user account and the second user account and reduce a total amount of data transmitted between the two users, thereby increasing an amount of available processing power on each computing device, as well as communication platform computing devices facilitating message transmissions, and reducing a total amount of network traffic.

In various examples, the suggestions interface can be configured to enable a respective user to edit a suggested message. For instance, the second user can access the suggested message via the second instance of the suggestions interface and can select an editing function associated therewith. The second user can make changes, such as to personalize the message, and can approve the updated suggested message for publication in association with the second user account. In some examples, the suggestions interface can enable a concurrent edit of the suggested message between the second user and the first user. For example, the second user can select an editing function that enables a concurrent edit of the suggested message by the first user and the second user. In response to receiving an indication of selection of the editing function, the communication platform can cause the suggested message to be concurrently (or asynchronously) presented to the first user via a first instance of the suggestions interface and to the second user via a second instance of the suggestions interface. The first user and/or the second user can then edit the message and view the edits in real-time or near real-time, such as to quickly and efficiently realize a finalized version of the suggested message with minimal data transfer between the two user accounts. In some examples, the communication platform can enable a communication functionality in association with the suggestions interface. In such examples, the communication platform can enable the first user and the second user to concurrently edit the suggested message and discuss the changes in real-time or near real-time, such as to avoid any confusion or miscommunication associated with the editing. The communication functionality can enable text, audio, and/or video communication between the users concurrently editing the document.

In some examples, in response to receiving an approval of a suggested message, the communication platform can be configured to store the suggested message in association with the second user account. The suggested message can be stored in association with delivered messages and/or messages to be delivered at a time in the future in association with the second user account. In various examples, the suggested message can be stored in association with a unique identifier that identifies the suggested message as a message that was suggested by the first user to the second user.

In some examples, in response to receiving an approval of a suggested message, the communication platform can be configured to identify a publication (e.g., delivery) time associated with the suggested message. The publication time can include a day, date, time, and/or the like for the communication platform to cause the message to be presented via one or more designated virtual spaces (e.g., destination virtual space). In some examples, the publication time can be designated by the first user, such as in association with the request to suggest a message for the second user to publish. In at least one example, the publication time can be included as a portion of the additional data described above. In some examples, the publication time can be designated by the second user, such as in association with an approval of the second message for publication. In some examples, the publication time can include a time, determined by the first user and/or the second user, to maximize impact, viewing, and/or the like of the message on a reader. In such examples, preservation of the publication time (e.g., publishing the message at the designated time), can preserve the user's intent with respect to the overall impact of the message.

In various examples, in response to determining that a current time is prior to (e.g., not associated with) the publication time, the communication platform can withhold data associated with the suggested message from publication. In such examples, the communication platform can continue to store the message in association with messages to be delivered at a time in the future. In some examples, in response to determining that a current time is associated (e.g., is within a threshold time of, or is equal to) the publication time, the communication platform can cause the suggested message to be presented via the one or more designated virtual spaces in association with the second user account, such as without additional input from the second user. Alternatively, in response to determining that a publication time is not associated with the suggested message, the communication platform can cause the suggested message to be presented via the designated virtual space(s) without delay. That is, if a particular date and/or time is not designated for publication, the communication platform can cause the suggested message to be published via the designated virtual space(s) immediately in response to receiving an approval thereof.

In some examples, after causing a presentation of the suggested message via the designated virtual space(s), the communication platform can be configured to update a first instance of the suggestions interface and/or a second instance of the suggestions interface to reflect that the message was delivered and/or published. In various examples, in response to publishing the suggested message, the communication platform can update an interface associated with delivered messages and/or messages to be delivered at a time in the future, to reflect the delivery. For example, the communication platform can cause a first count associated with the messages to be delivered at a time in the future to be reduced by one and a second count associated with delivered messages to be increased by one. For another example, the communication platform can cause a presentation of data associated with the suggested message (e.g., a preview, thumbnail, name, subject, etc.) to be presented in association with delivered messages and not in association with messages to be delivered.

In some examples, the second user can receive an indication that the first user suggested the message, such as via the second instance of the suggestions interface, and can decide to decline the suggestion. For instance, the second user can view the suggested message and can select a decline selectable control associated therewith. In some examples, in response to receiving the selection of the decline selectable control (e.g., an indication of selection thereof), the communication platform can withhold data associated with the suggested message from publication in association with the second user account. In some examples, the communication platform can update an indicator associated with the suggested message, and presented to the first user via the first instance of the suggestions interface, to reflect that the second user declined to adopt (e.g., cause a publication of) the suggested message. Additionally, the communication platform can update the second instance of the suggestions interface to reflect the declined suggested message. For example, the communication platform can cause the indicator associated with the suggested message to be presented via the second instance of the suggestions interface in association with declined messages. For another example, the communication platform can remove an indicator associated with the suggested message from the second instance of the suggestions interface.

Additionally or alternatively, the communication platform can be configured to remove an indicator associated with a suggested message from the second instance of the suggestions interface based on a determination that a time period associated therewith has expired. In some examples, the time period can be determined based on a user or organizational preference. For example, the first user or the second user may set, as a preference, that any suggested messages that are not approved or denied within a first period of time (e.g., 48 hours, 72 hours, one week, etc.) should be removed from the suggestions interface. Based on a determination that the period of time has expired, the communication platform can automatically remove data associated with the suggested message from presentation via the suggestions interface.

In some examples, the period of time can be determined based on a publication time associated with the message. As described above, the first user can, in some examples, provide a suggested date and/or time for publication of a suggested message. In such examples, in response to determination that a current time is equal to or after the suggested date and/or time without having received an approval or denial of the suggested message, the communication platform can automatically remove data associated with the suggested message from presentation via at least the second instance of the suggestions interface. In some examples, the communication platform can cause an indication of the suggested message (e.g., minimal data to reflect the existence of the suggested message) to persist via the first instance and/or the second instance of the suggestions interface.

In various examples, the communication platform can be configured to generate and send, to the first user, a notification that the time period associated with the suggested message expired. That is, the communication platform can generate an automated message to present to the first user, such as to inform the first user that no action associated with the suggested message was taken. The notification can include a pop-up message, a message presented in a virtual space associated with the first user, a text message, and/or any other type of notification configured to get attention of, and provide information to, a receiving user.

While techniques described herein are described with reference to messages, techniques described herein can be similarly applicable to any other object that can be generated via the communication platform. Examples of such objects can comprise documents, posts, channel descriptions, user profiles, board content, and/or the like. Furthermore, techniques described herein are described in the context of suggesting messages and/or other objects to be posted to the communication platform. However, in some examples, techniques described herein can be similarly applicable to providing suggested messages and/or other objects for posting on third-party platforms, such as social media platforms, email platforms, and/or the like. That is, in some examples, techniques described herein can be applicable to providing a suggested message within the communication platform for the suggested messages to be posted or otherwise presented via a third-party platform that is integrated with the communication platform (e.g., via one or more application programming interfaces (APIs) and/or software development kits (SDKs)). Additional details are described below.

Techniques described herein can streamline message publication in association with a user account. As described above, in existing technologies, a first user who desires to suggest a message for a second user to send can send a direct message to the second user with data associated with the suggested message. In some examples, and based on an amount of data the second user receives in a day and/or at a time, the suggested message may get lost in the plurality of messages. In such situations, the first user may be required to send multiple reminder messages, until receiving a message in response. In some examples, the response message can include edits to the suggested message, questions about the suggested message, and/or requests for data associated with the suggested message. As such, in existing technologies, the first user and the second user may be required to transmit a plurality of messages back and forth, to provide the second user with sufficient information necessary to send the suggested message. Techniques described herein facilitate a quick and efficient means by which a message suggested by a first user can be provided and approved for publication by the second user. In examples, the suggested message and associated data can be presented to the second user via a suggestions interface, and can be approved for publication, in some examples, with a single click by the second user. As such, the techniques described herein can reduce a total amount of data (e.g., direct messages) transmitted between the first user and the second user in association with a suggested message.

Further, the suggested message described herein can improve data security with respect to data sent via a communication platform. As described above, in existing technologies, a first user who desires to suggest a message for a second user to send can send a direct message to the second user with data associated with the suggested message. The second user then copies and pastes the suggested message into a message composer to send in association with the second user account. However, the copy and paste action can potentially result in confidential information, sensitive information, or other information that is subject to privacy considerations being shared unintentionally, such as by accidentally pasting the information into another document, message, or the like. Unlike the conventional systems for suggesting messages, the techniques described herein can be approved for publication via the suggestions interface, thereby preventing an unintentional data share. As such, the techniques described herein improve data security with respect to communication platforms.

Additionally, techniques described herein enable an efficient means for editing a suggested message prior to a publication thereof. In existing technologies, the second user receiving the suggested message would be required to copy and paste the suggested message, or portions thereof, from one direct message into another for publication. The copy and paste action could require significant computing resources, could lead to important data in the message being lost, and to a potentially negative user experience. Additionally, to get feedback on proposed changes to a suggested message, such as from the first user, the second user would sometimes need to copy and paste the entire message into another direct message to the first user and edit the message therein to request the feedback. The first user and the second user could go back and forth in this manner until reaching a finalized version, thereby utilizing a significant amount of computing resources, such as processing power and memory, and network bandwidth transmitting potentially lengthy, data rich, messages back and forth to reach a final draft of the message. Unlike this inefficient lengthy and computationally expensive process, the techniques described herein enable the first user and the second user to collaboratively edit a message in real-time or near real-time, thereby reducing consumption of computing resources and decreasing network congestion. Additional or alternative improvements to those described above are described below with reference to the figures.

FIG. 1 illustrates an example environment 100 for performing techniques described herein. In at least one example, the example environment 100 can include one or more server computing devices (or "server(s)") 102. In at least one example, the server(s) 102 can include one or more servers or other types of computing devices that can be embodied in any number of ways. For example, in the case of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can be associated with a communication platform that can leverage a network-based computing system to enable users of the communication platform to exchange data. In at least one example, the communication platform can be "group-based" such that the platform, and associated systems, channels, message objects, and/or virtual spaces, have security (that can be defined by permissions) to limit access to defined groups of users, such a defined group of users having, for instance, sole access to a given channel, message object, and/or virtual space. In some examples, such groups of users can be defined by identifiers, which can be associated with common access credentials, domains, or the like. In some examples, the communication platform can be a hub, offering a secure and private virtual space to enable users to chat, meet, call, collaborate, transfer files or other data, message objects, or otherwise communicate between or among each other, within secure and private virtual spaces, such as channel(s), direct message(s), board(s), and/or the like.

In some examples, each group can be associated with an organization, which can be associated with an organization identifier. Users associated with the organization identifier can chat, meet, call, collaborate, transfer files or other data, message, or otherwise communicate between or among each other in a secure and private virtual space available via the communication platform. In some examples, each group can be associated with a workspace, associated with a workspace identifier. Users associated with the workspace identifier can chat, meet, call, collaborate, transfer files or other data, message, or otherwise communicate between or among each other in a secure and private virtual space available via the communication platform. In some examples, a group can be associated with multiple organizations and/or workspaces. In some examples, an organization can be associated with multiple workspaces or a workspace can be associated with multiple organizations.

In at least one example, the server(s) 102 can communicate with a user computing device 104 via one or more network(s) 106. That is, the server(s) 102 and the user computing device 104 can transmit, receive, and/or store data (e.g., content, message objects, data, or the like) using the network(s) 106, as described herein. In some examples, the user computing device 104 can comprise a "client" associated with a user. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like. In some examples, users can be associated with designated roles (e.g., based at least in part on an organization chart) and/or types (e.g., administrator, verified, etc.).

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile, nonvolatile, removable, and/or non-removable memory or other media implemented in any type of technology for storage of data, such as computer-readable instructions, message objects, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a suggestions component 116, a virtual space (VS) management component 118, an operating system 120, and a datastore 122.

In at least one example, the suggestions component 116 can receive, from a first user account associated with a first user of the communication platform, a request to suggest a message, to a second user, for publication in association with a second user account of the second user. In various examples, the request can be received in association with a virtual space, such as a channel, direct message instance, board, or other virtual space. In such examples, the request can be submitted in association with a compose function of the virtual space. For instance, the first user can input the suggested message (e.g., message with annotated suggestions) into a composition input box associated with the virtual space, and can select an option to suggest the message. The first user can then input additional data associated with the suggested message, such as a user identifier associated with the second user.

In various examples, in response to determining that the suggested message is input in association with a particular virtual space, the suggestions component 116 can automatically associate the particular virtual space with the suggested message. That is, the suggestions component 116 can cause a virtual space identifier to be associated with the suggested message such that, when the suggested message is approved by the second user, the suggested message is published via the particular virtual space (e.g., destination virtual space). In some examples, the suggestions component 116 can receive virtual space identifiers associated with additional or alternative virtual spaces to associate with the message. In such examples, the suggestions component 116 can associate the virtual space identifiers with the suggested message.

In some examples, the suggestions component 116 can receive the additional or alternative virtual space identifiers in response to a request for additional data. That is, the suggestions component 116, in response to receiving the request to suggest the message, can send, to the user computing device 104 associated with the first user, a request for additional data to associate with the suggested message. As discussed above, the additional data can include virtual space identifiers to be associated with the suggested message. The virtual space identifiers can identify particular virtual spaces via which the first user proposes a publication of the suggested message. In various examples, the second user can include additional or alternate virtual space(s) via which the suggested message is to be published, such as in an editing action prior to approving (e.g., accepting, adopting, etc.) the suggested message. In such examples, the suggestions component 116 can receive the edits, from a user computing device 104 associated with the second user, and can associate the additional or alternate virtual space(s) with the suggested message.

In some examples, the additional data can include a publication time associated with the suggested message. The publication time can include a date, day, and/or time associated with a publication of the suggested message. In some examples, absent a specified publication time, the suggestions component 116 can cause the suggested message to be published, via one or more designated channels, immediately after receiving an indication of acceptance thereof from the second user. In various examples, based on an identification of a publication time associated with an approved suggested message (e.g., suggested message that the second user approves of or adopts for publication), the suggestions component 116 can cause the suggested message to be published via the designated virtual space(s) at the publication time. In some examples, the suggestions component 116 can store the suggested message in association with the second user account, such as with an indication that the suggested message is to be delivered at a time in the future. In various examples, the suggestions component 116 can be configured to determine that a current time is within a threshold time (e.g., 1 minute, 30 seconds, 5 seconds, etc.) of the publication time associated with the suggested message, and can cause the suggested message to be published via the designated virtual space(s).

In some examples, the additional data can include a note or other message composed by the first user, addressed to the second user, and associated with the suggested message. In some examples, the note can include an explanation as to why the first user suggested the message. For example, the first user can include a note that says, "I think this message would be more impactful coming from you." In some examples, the note can include additional details associated with the message, such as background information and/or the like. In some examples, the note can include a simple greeting from the first user to the second user.

In various examples, the suggestions component 116 can receive the suggested message and/or the additional data, and can cause a presentation thereof in association with the suggested message on a user interface associated with the second user account. In at least one example, the user interface can include a suggestions interface. The suggestions interface can include one or more suggested messages that are associated with a user account, such as the second user account associated with the second user. In some examples, the suggestions interface can provide a means by which an associated user can interact with one or more suggested messages, such as to view, approve, deny, and/or edit a message that is suggested to the associated user.

In some examples, the suggestions interface can additionally be configured to enable the associated user to compose and send a suggested message to another user. That is, the first user, in some examples, can submit the request to suggest the message to the second user via a first instance of the suggestions interface. In such examples, the first user can input the suggested message and/or additional data via the first instance of the suggestions interface and the suggestions component 116 can cause a first instance of the suggested message to be presented via the first instance of the suggestions interface, such as in association with sent or pending suggested messages. Additionally or alternatively, the suggestions component 116 can cause a second instance of the suggested message to be presented via a second instance of the suggestions interface associated with the second user, such as in association with received suggested messages.

In various examples, the suggestions component 116 can be configured to receive interaction data from the second user account (e.g., from the user computing device associated with the second user account), the interaction data including one or more user interactions, by the second user, with the suggested message. In at least one example, the suggestions component 116 can be configured to update the first instance of the suggestions interface and the second instance of the suggestions interface based on the interaction data. That is, the suggestions component 116 can receive data associated with one or more interactions by the second user with the suggested message and can update the second instance of the suggested message and/or the first instance of the suggested message based on the interaction(s). The interaction data can include data associated with an approval, denial (e.g., decline), and/or edit of the suggested message.

In at least one example, the update can include a status update associated with the suggested message. The status update can include an indication that the suggested message is unapproved (e.g., pending approval), denied, approved, pending delivery or publication, delivered (e.g., published), and/or the like. That is, the suggestions component 116 can be configured to update, in real-time or near real-time, a status associated with the suggested message, thereby negating a need for the first user to send query or reminder messages to the second user regarding the suggested message. The reduction in query and/or reminder messages can reduce network traffic and improve the functioning of the user computing devices 104, such as by reducing a total number of messages processed and stored in association therewith.

In various examples, in response to receiving, as interaction data, an indication of selection of an approve selectable control (e.g., approval of the suggested message), the suggestions component 116 may either cause a presentation of the suggested message via one or more designated virtual spaces in association with the second user account (e.g., second user designated as the sender or author of the message) or schedule a future presentation of the suggested message via the designated virtual space(s). Additionally, the suggestions component 116 can update the first instance of the suggested message and/or the second instance of the suggested message to indicate the approval. In response to receiving an indication of selection of a decline selectable control, the suggestions component 116 can flag the suggested message to not be sent. In at least one example, the suggestions component 116 can update the first instance of the suggested message and/or the second instance of the suggested message to indicate the declined message. In some examples, the suggestions component 116 can additionally provide an indication to the first user that the second user declined to adopt the suggested message, such as via a notification, automated message, and/or the like.

In various examples, the suggestions component 116 can receive, as interaction data, a request to edit the suggested message. In some examples, the request can include a request, from the second user, to independently (e.g., without input from the first user) edit the suggested message. In such examples, in response to receiving the request, the suggestions component 116 can render the suggested message in an editable interface associated with the suggestions interface. That is, the suggestions component 116 can enable the second user to modify the suggested message and approve a modified version of the suggested message.

In some examples, the request can include a request to collaboratively edit the suggested message with one or more other users. In at least one example, a collaborative edit can be between the second user and the first user (e.g., the author(s) of the suggested message). In some examples, the suggestions component 116 can provide a means by which the second user can invite one or more other users to assist in the collaborative edit of the message. In some examples, in response to receiving a request to collaboratively edit the suggested message, the suggestions component 116 can cause an editable version of the suggested message to be presented via the first instance of the suggestions interface and the second instance of the suggestions interface. Though described herein as a collaborative edit between the first user (e.g., sending user, original author of the message) and the second user (e.g., receiving user, user associated with a future publication of the suggested message), this is not intended to be so limiting, and the collaborative edit can be between the second user and one or more other users as designated by the second user for the collaborative edit. For example, the second user can input one or more user identifiers associated with other users with whom the second user wants to collaboratively edit the suggested message. In response to receiving the user identifier(s), the suggestions component 116 can identify user account(s) associated with the user identifier(s), and update respective suggestions interface(s) associated with the user account(s) to include the editable version of the suggested message.

In at least one example, each of the collaborators (e.g., second user, first user, other users designated by the second user, etc.) can interact with respective instances of the suggestions interface to provide comments and/or other feedback, add new content to the suggested message, remove contents from the suggested message, revise contents of the suggested message, view a history of modifications (e.g., additions, revisions, etc.), accept proposed modifications, and/or the like. In at least one example, the suggestions interface can enable the collaborators to generate and/or edit the suggested message in real-time or near real-time. In at least one example, when a client of one of the collaborators receives an input associated with the suggested message, the input can be sent to the suggestions component 116, which can update the suggested message based at least in part on such an input. In at least one example, such an input can be pushed to other instances of the suggestions interface using techniques such as operational transform or the like. That is, in at least one example, the suggestions component 116 can enable real-time or near real-time collaboration on suggested messages and/or other objects.

In at least one example, one of the collaborators can initiate a communication instance in association with an edit of the suggested message. In various examples, the communication instance can enable communications to be sent between users collaborating on the edit. In some examples, the collaboration can include a concurrent collaboration. That is, the collaboration can include at least the second user and one other user collaborating on the suggested message edit at a same time. In such an example, the communication instance can enable real-time or near real-time communications between the collaborators. In some examples, the collaboration may be asynchronous (e.g. not concurrent). In such examples, the communication instance can enable sharing of contextual data associated with an edit, such as to enable a viewing user to quickly assess an edit made by another collaborator. In at least one example, the suggestions component 116 can cause the communication instance to be presented via the suggestions interface concurrently with the editable version of the suggested message. That is, the communication instance can be presented in a split screen with the suggested message, during an edit thereof.

In various examples, the suggestions component 116 can enable the second user to terminate a collaborative edit of a suggested message. In some examples, the suggestions component 116 can provide a lock control via which the second user m can ay lock all or a portion of the suggested message. In response to receiving an indication of selection of the lock control, the suggestions component 116 can de-activate an edit function of the suggested message in association with other instances of the suggestions interface. That is, the second user may lock the suggested message, thereby disabling an editing function for other users, but may continue to edit the suggested message as desired. In some examples, the suggestions component 116 can be configured to lock the suggested message from editing in response to receiving an indication of selection of the approve selectable control. For example, in response to receiving an indication of selection of the approve selectable control, the suggestions component 116 can lock the suggested message, thereby terminating the collaborative edit.

In some examples, in response to receiving a selection of the approve selectable control, the suggestions component 116 can be configured to identify a publication (e.g., delivery) time associated with the suggested message. The publication time can include a day, date, time, and/or the like for the communication platform to cause the message to be presented via one or more designated virtual spaces. In some examples, the publication time can be designated by the first user, such as in association with the request to suggest a message for the second user to publish. In at least one example, the publication time can be included as a portion of the additional data described above. In some examples, the publication time can be designated by the second user, such as in association with an approval of the second message for publication.

In various examples, in response to determining that a current time is prior to (e.g., not associated with) the publication time, the suggestions component 116 can withhold data associated with the suggested message from publication. In such examples, the suggestions component 116 can continue to store the message in association with messages to be delivered at a time in the future. In some examples, in response to determining that a current time is associated (e.g., is within a threshold time of, is equal to) the publication time, the suggestions component 116 can exchange data with the VS management component 118 to post the suggested message to the designated virtual space(s) in association with the second user account, such as without additional input from the second user. Alternatively, in response to determining that a publication time is not associated with the suggested message, the suggestions component 116 can cause the suggested message to be presented via the designated virtual space(s) without delay. That is, if a particular date and/or time is not designated for publication, the suggestions component 116 can cause the suggested message to be published via the designated virtual space(s) immediately in response to receiving an approval thereof.

In some examples, after causing a presentation of the suggested message via the designated virtual space(s), the suggestions component 116 can be configured to update a first instance of the suggestions interface and/or a second instance of the suggestions interface to reflect that the suggested message was published (e.g., delivered, presented via a virtual space, etc.). In various examples, in response to publishing the suggested message, the suggestions component 116 can update an interface associated with delivered messages and/or messages to be delivered at a time in the future, to reflect the delivery. For example, the suggestions component 116 can cause a first count associated with the messages to be delivered at a time in the future to be reduced by one and a second count associated with delivered messages to be increased by one. For another example, the suggestions component 116 can cause a presentation of data associated with the suggested message (e.g., a preview, thumbnail, name, subject, etc.) to be presented in association with delivered messages and not in association with messages to be delivered.

Additionally or alternatively, the suggestions component 116 can be configured to remove an indicator associated with the suggested message from at least the second instance of the suggestions user interface based on a determination that a time period associated therewith has expired. In some examples, the time period can be determined based on a user or organizational preference. For example, the first user or the second user can set, as a user preference, that any suggested messages that are not approved or denied within a first period of time (e.g., 48 hours, 72 hours, one week, etc.) should be removed from respective instances of the suggestions interface. Based on a determination that the period of time has expired, the suggestions component 116 can automatically remove an indicator associated with the suggested message from presentation via the respective instance of the suggestions interface.

In some examples, the period of time can be determined based on a publication time associated with the message. As described above, the first user can, in some examples, provide a suggested date and/or time for publication of a suggested message. In such examples, in response to determination that a current time is equal to or after the suggested date and/or time without having received an approval or denial of the suggested message, the suggestions component 116 can automatically remove data associated with the suggested message from presentation via at least the second instance of the suggestions interface. In some examples, the suggestions component 116 can cause an indication of the suggested message (e.g., minimal data to reflect the existence of the suggested message) to persist via the first instance and/or the second instance of the suggestions interface. For example, the suggestions component 116 can update the indicator associated with the suggested message to indicate that the suggested message has expired.

In various examples, the suggestions component 116 can be configured to generate and send, to the first user, a notification that the time period associated with the suggested message expired. That is, the suggestions component 116 can generate an automated message to present to the first user, such as to inform the first user that no action associated with the suggested message was taken. The notification can include a pop-up message, a message presented in a virtual space associated with the first user, a text message, and/or any other type of notification configured to get attention of, and provide information to, a receiving user.

In some examples, as described above, techniques described herein can be applicable to objects other than messages. For instance, in at least one example, techniques described herein can be used to enable suggestions to publish or otherwise share documents, posts, channel descriptions, and/or the like, which can be managed by the suggestions component 116 or another component of the server(s) 102.

In at least one example, the VS management component 118 can manage channels of the communication platform. In at least one example, the communication platform can be "channel-based" such that the platform can be organized into channels having security (that can be defined by permissions) to limit access to defined groups of users (e.g., members of the channels). A channel, or virtual space, can be a data route used for exchanging data between and among systems and devices associated with the communication platform such as, for example, content and/or message objects. In some examples, a channel may be "public," which may allow any user within a group (e.g., associated with an organization identifier, associated with a workspace identifier, etc.) with which the channel is associated to join and participate in the data sharing through the channel. In some examples, a channel may be "private," which may restrict data communications in the channel to certain users or users having particular roles (e.g., managers, administrators, etc.) and/or types (e.g., verified, administrator, etc.). In some examples, a channel may be an "announcement" channel, which may restrict communication in the channel to announcements or may otherwise be associated with announcements instead of other more granular topics of other channels.

In at least one example, a channel can be associated with a defined group of users within the same organization. Such a channel can be an "internal channel" or an "internally shared channel." In some examples, a channel may be "shared" or "externally shared," which may allow users associated with two or more different groups (e.g., entities associated with two or more different organization and/or workspace identifiers) to join and participate in the data sharing through the channel. A shared channel may be public such that it is accessible to any user of groups associated with the shared channel, or may be private such that it is restricted to access by certain users or users having particular roles and/or types. A "shared channel" or an "externally shared channel" can enable two or more organizations, such as a first organization and a second organization to share data, exchange communications, and the like (hence, a "shared" channel or an "externally shared channel" can refer to a channel which is accessible across different organizations, whereas an "internal channel" can refer to a communication channel which is accessible within a same organization). In an example, the first organization and the second organization can be associated with different organization identifiers, can be associated with different business entities, have different tax identification numbers, and/or otherwise can be associated with different permissions such that users associated with the first organization and users associated with the second organization are not able to access data associated with the other organization, without the establishment of an externally shared channel. In some examples, a shared channel can be shared with one or more different workspaces and/or organizations that, without having a shared channel, would not otherwise have access to each other's data by the nature of the permission-based and/or group-based configuration of the communication platform described herein.

In at least one example, the VS management component 118 can receive a request to generate a channel. In some examples, the request can include a name that is to be associated with the channel, one or more users to invite to join the channel, and/or permissions associated with the channel. In at least one example, one or more user identifiers associated with one or more users and/or one or more user accounts can be mapped to, or otherwise associated with, a channel (e.g., a channel identifier associated therewith). User(s) associated with a channel can be "members" of the channel. Members of a channel can communicate with other members via the channel. That is, in at least one example, the VS management component 118 can establish a channel between and among various user computing devices associated with user identifiers associated with the channel, allowing the user computing devices to communicate and share data between and among each other. As described herein, in some examples, such communication and/or sharing of data can be via one or more messages (posted directly by a user or suggested for publication in association with a user account of the user) that can be exchanged via a channel. In at least one example, the VS management component 118 can manage such communications and/or sharing of data. In some examples, data associated with a channel can be presented via a user interface.

As described above, in at least one example, one or more permissions can be mapped to, or otherwise associated with, a channel and/or members associated therewith. Such permission(s) can indicate which user(s) have permission to access the channel, actions, messages and/or other objects associated with the channel, which user(s) and/or type(s) of users are permitted to add or remove members, which user(s) and/or types of users are permitted to share the channel with other users, a retention policy associated with data in the channel, whether the channel is public or private, or the like.

In at least one example, the VS management component 118 can manage "direct messages," which can comprise communications with individual users or multiple specified users (e.g., instead of all, or a subset of, members of an organization). In at least one example, a "direct message" can comprise a data route, or virtual space, used for exchanging data between and among systems and devices associated with the communication platform (e.g., content and/or message objects). In some examples, a direct message can be a private message object between two or more users of the communication platform. In some examples, a direct message can be "shared," which may allow users associated with two or more different groups (e.g., entities associated with two or more different organization and/or workspace identifiers) to join and participate in the data sharing through the direct message.

In at least one example, the VS management component 118 can receive a request to generate a direct message. In some examples, the request can include identifiers associated with one or more users that are intended recipient(s) (e.g., recipient user(s)) of the direct message. In at least one example, one or more user identifiers associated with one or more users and/or one or more user accounts can be mapped to, or otherwise associated with, a direct message (e.g., or direct message identifier associated therewith). User(s) associated with a direct message can communicate with one another and/or otherwise share data with one another via the direct message. As described herein, in some examples, such communication and/or sharing of data can be via one or more message objects that can be exchanged via the direct message. In at least one example, the VS management component 118 can manage such communications and/or sharing of data. In some examples, data associated with a direct message can be presented via a user interface.

Additionally, in some examples, the VS management component 118 can be configured to manage a communication instance associated with a suggested message. As discussed above, the communication instance can enable the first user and the second user to exchange messages associated with a suggested message, such as during a collaborative edit thereof. The communication instance can include a means of direct communication between at least the first user and the second user (and/or other collaborators) to enable real-time or near real-time conversation. In some examples, the communication instance can include an audio and/or video instance. As illustrated below with regard to FIGS. 4C and 4D, the communication instance can be presented concurrently with the suggested message in a split screen (or bifurcated) view. That is, the users can view and access data associated with the message and the communication instance at the same time, without needing to modify screens, change viewing windows, and/or the like.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user device 104. The datastore 122 can comprise one or multiple databases, which can include user data 124, permission data 126, and virtual space (VS) data 128. Additional or alternative data can be stored in the datastore and/or one or more other datastores.

In at least one example, the user data 124 can store data associated with users of the communication platform. In at least one example, the user data 124 can store data in user profiles (which can also be referred to as "user accounts"). In some examples, a user can be associated with a single user profile. In some examples, a user can be associated with multiple user profiles. A user profile can store data associated with a user, including, but not limited to, one or more user identifiers associated with multiple, different organizations, groups, or entities with which the user is associated, one or more group identifiers for groups (or, organizations, teams, entities, or the like) with which the user is associated, one or more channel identifiers associated with channels to which the user has been granted access, an indication whether the user is an owner or manager of any channels, an indication whether the user has any channel restrictions, one or more direct message identifiers associated with direct messages with which the user is associated, one or more document identifiers associated with collaborative and/or personal documents with which the user is associated, a plurality of message objects, a plurality of emojis, a plurality of conversations, a plurality of conversation topics, an avatar, an email address, a real name (e.g., John Doe), a username (e.g., j doe), a password, a time zone, a status, and the like.

In some examples, the user data 124 can store indications of user preferences, which can be explicitly indicated or learned. In some examples, the user data 124 of a user can indicate a role or position of a user, which can be determined based at least in part on an organizational chart and/or learned. In some examples, the communication platform can analyze messaging and/or other interaction data to determine relationships between users and/or relative ranks and can infer organizational charts. In some examples, the user data 124 of a user can indicate a user type of the user, for example, whether the user is an administrator, a verified user, and/or the like. In at least one example, user type can be a designation provided by the communication platform (e.g., wherein roles can be designated by organizations, workspaces, teams, and/or other groups). In some examples, the communication platform can store indications of which users and/or virtual spaces a user communicates with and/or in, a frequency of such communication, topics associated with such communications, reactions and/or feedback associated with such communications and/or the like.

In at least one example, the permission data 126 can store data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, a profile and/or account associated with the user data 124. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In some examples, the permission data 126 can store data associated with permissions of groups associated with the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a group can be mapped to, or otherwise associated with, data associated with the group. In some examples, permissions can indicate restrictions on individual groups, restrictions on channel(s) associated with individual groups, restrictions on user(s) associated with individual groups, and the like. In at least one example, the permissions can support the communication platform by maintaining security for limiting access to a defined group of users. In some examples, such groups can be defined by common access credentials, group identifiers, or the like, as described above.

In some examples, the permission data 126 can store data associated with permissions of individual channels. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a channel can be mapped to, or otherwise associated with, data associated with the channel in the VS data 128. In some examples, permissions can indicate restrictions on individual channels, restrictions on user(s) associated with individual channels, and the like.

In some examples, the permission data 126 can store data associated with permissions of individual message objects or other objects. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user (e.g., the originator of the message object), or the like. In some examples, permissions associated with a message object or other object can be mapped to, or otherwise associated with, data associated with the message object or other object. In some examples, permissions can indicate viewing permissions, access permissions, editing permissions, etc.

In at least one example, the VS data 128 can store data associated with individual channels, direct messaging instances, communication instances (e.g., associated with collaborative editing sessions), collaborative documents (e.g., documents shared by two or more users), audio and/or video communications, and/or the like. In at least one example, the VS management component 118 can establish a virtual space between and among various user computing devices, allowing the user computing devices to communicate and share data between and among each other. In at least one example, a virtual space identifier can be assigned to a virtual space (e.g., channel, direct message instance, board, audio or video communication, etc.), which indicates the physical address in the VS data 128 where data related to that channel is stored. Individual messages or other objects posted to a channel can be stored in association with the VS data 128.

As described above, messages posted, or otherwise sent and/or received, via channels, direct messages, collaborative documents, etc. can be stored in association with the VS data 128. In some examples, such messages can additionally or alternatively be stored in association with the user data 124. In some examples, messages can be associated with individual permissions, as described herein. In at least one examples, the individual permissions can include an authorization of a user to suggest messages for one or more other users. In some examples, the authorization can include an authorization to suggest messages for one or more designated users. For example, a chief executive officer (CEO) of an organization may associate, as an individual permission associated with a user account, an authorization for an executive assistant to suggest messages for the CEO and/or other officers of the organization. In some examples, the individual permissions may enable a user to suggest messages to another user based on the users sharing at least one of a same organization identifier, workspace identifier, channel identifier, and/or the like. In at least one examples, the individual permissions can prevent unauthorized people from suggesting messages to other people. That is, the individual permissions enabling suggested messages may prevent a user from spamming other users of the communication platform with various suggested messages.

The datastore 122 can store additional or alternative types of data, which can include, but is not limited to communication data (e.g., data shared in an ephemeral communication instance between at least two users), interaction data (e.g., data associated with additional or alternative interactions with the communication platform), model(s), etc.

In some examples, the datastore 122 can be partitioned into discrete items of data that can be accessed and managed individually (e.g., data shards). Data shards can simplify many technical tasks, such as data retention, unfurling (e.g., detecting that message object contents include a link, crawling the link's metadata, and determining a uniform summary of the metadata), and integration settings. In some examples, data shards can be associated with groups (e.g., organizations, workspaces), channels, direct messages, users, documents (e.g., shared documents), or the like.

In some examples, individual groups can be associated with a database shard within the datastore 122 that stores data related to a particular group identification. For example, a database shard can store electronic communication data associated with members of a particular group, which enables members of that particular group to communicate and exchange data with other members of the same group in real time or near-real time. In this example, the group itself can be the owner of the database shard and has control over where and how the related data is stored and/or accessed. In some examples, a database shard can store data related to two or more groups (e.g., as in a shared channel, such as an externally shared channel).

In some examples, a channel can be associated with a database shard within the datastore 122 that stores data related to a particular channel identification. For example, a database shard can store electronic communication data associated with the channel, which enables members of that particular channel to communicate and exchange data with other members of the same channel in real time or near-real time. In this example, a group or organization can be the owner of the database shard and can control where and how the related data is stored and/or accessed.

In some examples, a direct message can be associated with a database shard within the datastore 122 that stores data related to a particular direct message identification. For example, a database shard may store electronic communication data associated with the direct message, which enables a user associated with a particular direct message to communicate and exchange data with other users associated with the same direct message in real time or near-real time. In this example, a group or organization can be the owner of the database shard and can control where and how the related data is stored and/or accessed.

In some examples, a suggested message can be associated with a database shard within the datastore 122 that stores data related to a particular suggested message. For example, a database shard may store the suggested message, additional data, edits made to the suggested message, and/or electronic communication data associated with a communication instance corresponding to the suggested message, which enables users collaboratively editing a suggested message to communicate and exchange data in real-time or near real-time. In this example, a group or organization (e.g., of the suggesting user or of the recipient user) can be the owner of the database shard and can control where and how the related data is stored and accessed.

In some examples, individual users can be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored and/or accessed.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Web sockets, Application Programming Interfaces (APIs) (e.g., using API calls), Hyper Text Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 132, computer-readable media 134, one or more communication interfaces 136, and input/output devices 138.

In at least one example, each processor of the processor(s) 132 can be a single processing unit or multiple processing units, and can include single or multiple computing units or multiple processing cores. The processor(s) 132 can comprise any of the types of processors described above with reference to the processor(s) 108 and can be the same as or different from the processor(s) 108.

The computer-readable media 134 can comprise any of the types of computer-readable media 134 described above with reference to the computer-readable media 110 and can be the same as or different from the computer-readable media 110. Functional components stored in the computer-readable media can optionally include at least one application 140 and an operating system 142.

In at least one example, the application 140 can be a mobile application, a web application, or a desktop application, which can be provided by the communication platform or which can be an otherwise dedicated application. In at least one example, the application 140 can be a native application associated with the communication platform. In some examples, individual user computing devices associated with the environment 100 can have an instance or versioned instance of the application 140, which can be downloaded from an application store, accessible via the Internet, or otherwise executable by the processor(s) 132 to perform operations as described herein. That is, the application 140 can be an access point, enabling the user computing device 104 to interact with the server(s) 102 to access and/or use communication services available via the communication platform. In at least one example, the application 140 can facilitate the exchange of data between and among various other user computing devices, for example via the server(s) 102. In at least one example, the application 140 can present user interfaces, as described herein. In at least one example, a user can interact with the user interfaces via touch input, keyboard input, mouse input, spoken input, or any other type of input. Additional or alternative access points, such as a web browser, can be used to enable the user computing device 104 to interact with the server(s) 102 as described herein. That is, in examples where the application 140 is described as performing an operation below, in an additional or alternative example, such an operation can be performed by another access point, such as a web browser or the like.

In at least one example, the user computing device 104 can correspond to a "client" of a user. In some examples, the user computing device 104 can be associated with multiple "clients," in which case, each instance of an application or other access point can be its own client. For example, a user can be signed into a first client (e.g., the application 140) and a second client (e.g., a web browser), both of which can be associated with the user computing device 104. In another example, the user can be signed into a first client (e.g., the application 140) and a second client, each of which can be on separate user computing devices.

As described above, a client, which can be associated with the user computing device 104, can present one or more user interfaces. A non-limiting example of a user interface 130 is shown in FIG. 1. As illustrated in FIG. 1, the user interface 130 can present data associated with a suggestions interface 144 (e.g., suggestions user interface). In some examples, the user interface 130 can include a first section 146 (e.g., which can be a portion, pane, or other partitioned unit of the user interface 130), that includes user interface element(s) representing data associated with channel(s), direct message(s), etc. with which the user (e.g., account of the user) is associated. Additional details associated with the first section 146 and user interface element(s) are described below with reference to FIG. 2.

In at least one example, the user interface 130 can include a second section 148 (e.g., which can be a portion, pane, or other partitioned unit of the user interface 130) that is configured to present the suggestions interface 144, which can enable a user to interact with one or more suggested messages that are suggested by the user and/or to the user by another user. a first user to suggest a message to a second user. The suggestions interface 144 can be presented as a pop-up, as shown, or an overlay, a portion of the user interface 130, in association with another input mechanism of the user interface 130, a new user interface, and/or the like. In some examples, the suggestions interface 144 can be triggered for presentation in response to a request to generate a new suggested message. In some examples, aspects of the suggestions interface 144 can be integrated into other features of the user interface 130, as described below. Additional details associated with the user interface 130 are described below with reference to FIGS. 2-4D.

Additionally or alternatively, the second section 148 can be configured to present data associated with a data feed (or, "feed") indicating messages posted to and/or actions taken with respect to one or more channels, direct messages, and/or other virtual spaces for facilitating communications (e.g., a virtual space associated with event(s) and/or action(s), etc.) as described herein. In at least one example, in response to determining that a current time is within a threshold time of a publication time associated with a suggested message, the suggestions component 116 can cause a presentation of the suggested message via one or more designated virtual spaces. As such, when a user selects an indicator associated with at least one of the designated virtual space(s), such as in the first section 146, the suggested message can be presented in the second section 148 in a data feed associated with the selected virtual space.

In various examples, data associated with the data feed presented in the second section 148 can be associated with the same or different workspaces. That is, in some examples, the second section 148 can present data associated with the same or different workspaces via an integrated data feed. In some examples, the data can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user (e.g., member of the channel) posted the message object and/or performed an action. In the example of the suggested message provided by the first user for the second user to publish, the published suggested message can include an identifier associated with the second user that indicates that the message was published in association with the second user account. In examples where the second section 148 presents data associated with multiple workspaces, at least some data can be associated with an indication of which workspace the data is associated with.

In at least one example, the first section 146 and the second section 148, in combination, can be associated with a "group-based communication user interface" from which a user can interact with the communication platform. Additional details associated with the user interface 130, the first section 146, and the second section 148, are described below with reference to FIG. 2.

In at least one example, the operating system 142 can manage the processor(s) 132, computer-readable media 134, hardware, software, etc. of the user computing device 104.

The communication interface(s) 136 can include one or more interfaces and hardware components for enabling communication with various other devices (e.g., the user computing device 104), such as over the network(s) 106 or directly. In some examples, the communication interface(s) 136 can facilitate communication via Websockets, APIs (e.g., using API calls), HTTPs, etc.

The user computing device 104 can further be equipped with various input/output devices 138 (e.g., I/P devices). Such I/O devices 138 can include a display, various user interface controls (e.g., buttons, joystick, keyboard, mouse, touch screen, etc.), audio speakers, microphones, cameras, connection ports and so forth.

While techniques described herein are described as being performed by the suggestions component 116, the VS management component 118, and the application 140, techniques described herein can be performed by any other component, or combination of components, which can be associated with the server(s) 102, the user computing device 104, or a combination thereof.

Figure 2:
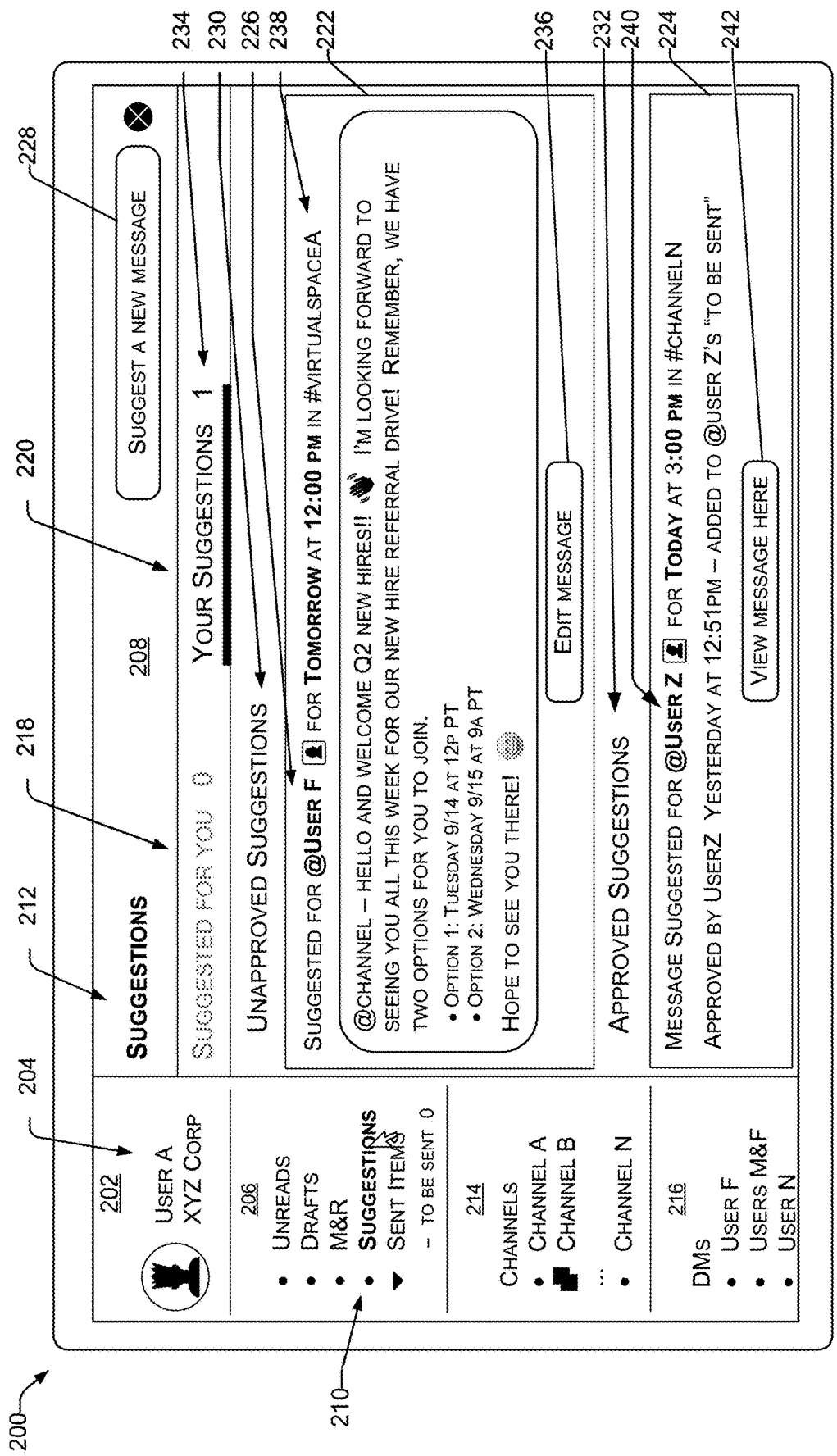
FIG. 2 illustrates an example user interface associated with a communication platform, as described herein, wherein a suggestions interface for exchanging suggested messages between users is presented via the user interface.

FIG. 2 illustrates an example user interface 200 presented via a communication platform, as described herein. The user interface 200 can correspond to the user interface 130 described above with reference to FIG. 1. As described above, in some examples, a user interface 200 presented via the communication platform can include a first section 202 (which can correspond to the first section 146 described above with reference to FIG. 1) that includes user interface element(s) representing virtual space(s) associated with the workspace(s) with which a first user 204 (e.g., account of the user) is associated. In at least one example, the first section 202 can include one or more sub-sections, which can represent different virtual spaces. For example, a first sub-section 206 can include user interface elements representing virtual spaces that can aggregate data associated with a plurality of channels and/or workspaces. In at least one example, each virtual space can be associated with a user interface element in the first sub-section 206. In some examples, a user interface element can be associated with an actuation mechanism, that when actuated, can cause the application 140 to present data associated with the corresponding virtual space via a second section 208 of the user interface 200 (which can correspond to the second section 148 described above with reference to FIG. 1).

In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the second section 208, for example in a feed.

In another example, "drafts" can be associated with messages or other objects that have not yet been posted to a virtual space or otherwise sent to a receiving entity. In at least one example, a message, while being composed, can be associated with an indicator indicating that the message is a draft and can therefore be associated with the "drafts" referenced in the first sub-section 206.

In another example, a virtual space associated with "mentions and reactions" (e.g., "M & R") can be associated with messages or threads where the first user 204 (e.g., User A) has been mentioned (e.g., via a tag) or another user has reacted (e.g., via an emoji, reaction, or the like) to a message object or thread posted by the first user 204.

In at least one example, a virtual space can be associated with "suggestions" or suggested messages with which the user is associated. In at least one example, if the user requests to access the virtual space associated with "suggestions" (e.g., selection of a suggestions indicator 210), a suggestions interface 212 (which can correspond to the suggestions interface 144 described above with reference to FIG. 1) can be presented via the user interface 200 (e.g., in the second section). In at least one example, the suggestions interface 212 can include one or more messages that are suggested by a first user 204 (e.g., User A) for publication in association with another user account and/or one or more messages that are suggested to the first user 204 (by another user) for publication in association with a first user account of the first user 204. Additional details of the suggestions interface 212 are described below.

In another example, a virtual space can be associated with "sent items" corresponding to the first user account of the first user 204. In some examples, the sent items can include messages or other objects that are transmitted for publication in association with the first user account. In some examples, suggested messages that have been sent are displayed in the sent items section of the sending user. In some examples, suggested messages have an indicator that distinguishes suggested messages from other messages that have been posted. In some examples, a suggested message provided to the first user 204 from another user can be approved by the first user 204 for publication. In response to receiving an indication of approval of the suggested message, the communication platform can provide an indication thereof in association with the sent items. Based on a determination that a suggested message has been published via a designated virtual space (e.g., that a current time is associated with a publication time), the communication platform can provide an indication that the suggested message was sent or delivered. Based on a determination that the suggested message is approved and awaiting publication (e.g., current time is more than a threshold amount of time prior to a publication time), the communication platform can provide an indication that the suggested message is to be sent at a time in the future.

Though not illustrated, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via the user interface 200 (e.g., in the second section 208). In at least one example, the documents, as described herein, can be associated with an individual (e.g., private document for a user), a group of users (e.g., collaborative document), and/or one or more communication channel (e.g., members of the communication channel rendered access permissions to the document) to enable users of the communication platform to create, interact with, and/or view data associated with such documents. In some examples, the collaborative document can be a virtual space, a board, a canvas, a page, or the like for collaborative communication and/or data organization within the communication platform. In at least one example, a collaborative document can support editable text and/or objects that can be ordered, added, deleted, modified, and/or the like. In some examples, a collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

In at least one example, a collaborative document can include a publication or presentation of a suggested message, such as suggested by the first user for publication in association with the second user account. In such examples, the suggested message can be posted to the board with an indication that the suggested message is associated with (e.g., derived from, posted in association with) the second user account of the second user. In at least one example, a collaborative document can include section(s) and/or object(s) (e.g., tasks, calendar events, lists, messages including published suggested messages, posts, files, etc.). In some examples, each section can include one or more objects.

In at least one example, an object can be associated with an object type, which can include, but is not limited to, text (e.g., which can be editable), a task, an event, an image, a graphic, a link to a local object, a link to a remote object, a file, and/or the like. In some examples, the sections and/or objects can be reordered and/or otherwise rearranged, new sections and/or objects can be added or removed, and/or data associated with such sections and/or objects can be edited and/or modified. That is, collaborative documents can be created and/or modified for various uses. That is, users can customize and/or personalize collaborative documents to serve individual and/or group needs.

In some examples, if the first sub-section 206 includes a user interface element representative of a virtual space associated with multimedia clips (e.g., videos, audio files, stories, etc.) that is actuated by a user, multimedia clips associated with the user, which can be associated with different channels and/or virtual spaces, can be presented via the second section 208. In some examples, such multimedia clips can be presented via a feed. For the purpose of this discussion, a multimedia clip can correspond to audio and/or video content provided by a user associated with the communication platform.

In some examples, data presented via the second section 208 can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user(s) (e.g., member(s) of a channel) posted a message object, performed an action, and/or the like. Additional details are described below.

In at least one example, the first section 202 of the user interface 200 can include a second sub-section 214 that includes user interface elements representing channels to which the user (i.e., user profile) has access. In some examples, the channels can include public channels, private channels, shared channels (e.g., between workspaces or organizations), single workspace channels, cross-workspace channels, announcement channels, combinations of the foregoing, or the like. In some examples, the channels represented can be associated with a single workspace. In some examples, the channels represented can be associated with different workspaces (e.g., cross-workspace). In some examples, the channels represented can be associated with combinations of channels associated with a single workspace and channels associated with different workspaces.

In some examples, the second sub-section 214 can depict all channels, or a subset of all channels, that the user has permission to access (e.g., as determined by the permission data 126). In such examples, the channels can be arranged alphabetically, based on most recent interaction, based on frequency of interactions, based on channel type (e.g., public, private, shared, cross-workspace, announcement, etc.), based on workspace, in user-designated sections, or the like. In some examples, the second sub-section 214 can depict all channels, or a subset of all channels, that the user is a member of, and the user can interact with the user interface 200 to browse or view other channels that the user is not a member of but are not currently displayed in the second sub-section 214. In some examples, a new channel, generated subsequent to a request received at the VS management component 118 in FIG. 1 and accessible to the user, can be added to the second sub-section 214. The new channel can be generated by the user or added to the second sub-section 214 in response to acceptance of an invite sent to the user to join a new channel. In some examples, different types of channels (e.g., public, private, shared, etc.) can be in different sections of the second sub-section 214, or can have their own sub-sections or sub-sections in the user interface 200. In some examples, channels associated with different workspaces can be in different portions of the second sub-section 214, or can have their own sections or sub-sections in the user interface 200.

In some examples, the indicators can be associated with user interface elements that visually differentiate types of channels. For example, Channel B is associated with a double square user interface element instead of a circle user interface element. As a non-limiting example, and for the purpose of this discussion, the double square user interface element can indicate that the associated channel (e.g., Channel B) is an externally shared channel. In some examples, such a user interface element can be the same for all externally shared channels. In other examples, such a user interface element can be specific to the other group with which the externally shared channel is associated. In some examples, additional or alternative graphical elements can be used to differentiate between public channels, private channels, shared channels, channels associated with different workspaces, and the like. In other examples, channels that the user is not a current member of may not be displayed in the second sub-section 214 of the user interface 200. In such examples, the user can navigate to a different interface (not shown) to browse additional channels that are accessible to the user but to which the user is not currently a member.

In addition to the second sub-section 214, the first section 202 can include a third sub-section 216 that can include user interface elements representative of direct messages. That is, the third sub-section 216 can include user interface elements representative of virtual spaces that are associated with private message objects between one or more users, as described above.

In FIG. 2, the user can interact with a suggestions indicator 210 or the user interface element that corresponds to the suggestions interface 212 (e.g., suggestions user interface) in the first sub-section 206 and as such, the suggestions interface 212 can be presented in the second section 208. As discussed above, the suggestions interface 212 can include one or more messages that are suggested to the first user 204 (by another user) for publication in association with a first user account of the first user 204. In some examples, the message(s) suggested to the first user 204 can be presented in association with a suggested messages section 218. In such examples, and as will be discussed below with respect to FIG. 3B, in response to receiving a selection of an indicator associated with the suggested messages section 218, the communication platform can cause a presentation of data associated with the message(s) suggested to the first user 204 for publication in association with the first user account.

In at least one example, the suggestions interface 212 can include a suggestions section 220, including one or more message(s), such as first message 222 and second message 224, that the first user 204 has suggested to another user of the communication platform. In some examples, the first user and the other user (e.g., a second user 226) to whom the first user 204 suggests a message can be associated with a same organization. In such examples, the first user and the second user 226 can be associated with a same group or organization identifier. In some examples, the first user 204 and the second user 226 can be associated with different organizations. In various examples, to suggest a message for another user, the first user account of the first user 204 can have associated therewith permissions that enable the first user 204 to suggest one or more messages for other users. In some examples, the other users can designate the first user 204 as a message suggester, thereby causing the permissions to be associated with the first user account. In some examples, the permissions can be stored in permission data, such as permission data 126, associated with the first user account and/or other user accounts associated with the other users. For example, the second user 226 can enable permissions for the first user 204 to suggest one or more messages for the second user 226 and/or other users of the communication platform.

In various examples, the suggestions interface 212 can include a new message control 228 configured to enable the first user 204 to suggest a new message to another user of the communication platform. That is, by selecting the new message control 228, the first user 204 can initiate a request to suggest a new message to be published in association with another user account of another user. As will be described in greater detail below with regard to FIG. 4A, in response to receiving an indication of selection of the new message control 228, the communication platform can cause a new message window to be presented in association with the suggestions interface 212, such as to input the new message and/or additional data associated therewith.

In the illustrative example, the suggestions section 220 includes an unapproved suggestions section 230 and an approved suggestions section 232, though this is not intended to be so limiting and the suggestions section 220 can include one or more additional or alternative sections, such as suggestions pending delivery, and/or the like. In various examples, the unapproved suggestions section 230 can include one or more suggested messages generated by the first user 204 and provided to one or more other users. For example, the unapproved suggestions section 230 includes the first message 222 generated by the first user 204 and suggested to the second user 226 for publication in association with a second user account. In various examples, an indicator associated with the suggestions section 220 can include an alert or notification 234 indicating a number of messages that are pending approval. For example, the indicator includes an alert or notification 234 that indicates that a single message (e.g., the first message 222) is pending approval by the second user 226.

In various examples, the communication platform can enable a suggested message, such as the first message 222, to be edited by the suggesting user (e.g., the first user 204) prior to approval. In such examples, the suggested messages associated with the unapproved suggestions section 230 can include an edit control 236. In various examples, in response to receiving an indication of selection of the edit control 236, the communication platform can enable an editing interface to be presented in association with the associated message (e.g., the first message 222). The first user 204 can then edit the first message 222 via the editing interface. In various examples, the communication platform, in response to receiving an edit, can update an instance of the first message 222 that is presented to the second user 226 via a second instance of the suggestions interface 212. That is, the communication platform can be configured to modify the second instance of the first message 222 provided to the second user 226 in response to receiving an edit thereof by the first user 204.

In various examples, the first message 222 can have associated therewith additional data 238. The additional data 238 can include one or more virtual spaces (e.g., workspaces, channels, direct messaging instances, documents, etc.) via which the suggested message would be published, a suggested date and/or time for publication, a note to the second user explaining the reason for suggesting the message, and/or the like. In the illustrative example, the additional data 238 includes an identifier associated with the second user 226, a publication time (e.g., tomorrow at 12:00 pm), and a virtual space (e.g., virtual space A) associated with publication of the first message 222. Though this is not intended to be so limiting and the additional data 238 can include additional or alternate data, such as two or more virtual spaces for message publication, and/or the like.

As discussed above, the communication platform (e.g., suggestions component 116) can be configured to update the suggestions interface 212 in response to interaction data associated with other users to whom a message is suggested. For example, in response to receiving interaction data including an approval of the first message 222 by the second user 226, the communication platform can modify a presentation of the first message 222 and associate the modified first message 222 with the approved suggestions section 232.

As discussed above, the approved suggestions section 232 can include one or more messages that are suggested, by the first user 204, for association with another user account of another user and are subsequently approved by the other user. In various examples, an approval of a suggested message can include an adoption of the message, by the other user, for publication in association with the other user account of the other user. For example, the second message 224, which the first user 204 suggested for association with a third user account of a third user 240 (e.g., User Z), was subsequently approved by the third user 240.

In response to receiving interaction data associated with the approval of the second message 224 by the third user 240, the communication platform can update the approved suggestions section 232 to include data associated with the second message 224. In various examples, the data can include a presentation of the suggested message and/or additional data associated therewith. In the illustrative example, the data can include data associated with the suggested message, such as a portion of the additional data and data associated with the approval. For example, the data associated with the approval can include an indication of the user(s) who approved the suggested message, a date and/or time (e.g., timestamp) associated with the approval, and a follow on action, such as an indication that the message was published via a designated virtual space or was added to the a folder of messages associated with the third user account that are scheduled to be sent. In various examples, in response to identifying that the second message 224 was published via the designated virtual space (e.g., Channel N), the communication platform can update the data associated with the second message 224 to reflect the publication. In some examples, the update can include a timestamp associated with the publication of the second message 224 via the designated virtual space.

In various examples, the second message 224 can include a selectable control 242 via which the first user 204 can access the contents of the suggested message associated with the second message 224. In such examples, in response to receiving an indication of selection of the selectable control 242, the first user 204 can view the contents of the suggested message that is scheduled to be and/or was published in association with the third user account of the third user 240. In examples in which the suggested message associated with the second message 224 was published, the selectable control 242 can include a link to the designated virtual space (e.g., Channel N) via which the suggested message was published. That is, the selectable control 242 can facilitate an efficient access, by the first user 204, to the suggested message that was posted or published in association with the third user account, thereby decreasing an amount of time the first user 204 would be required to search for and locate the suggested message in the designated virtual space. As such, the techniques described herein can improve the functioning of the user computing device associated with the first user 204 by facilitating discovery of published suggested messages.

Figure 3A:
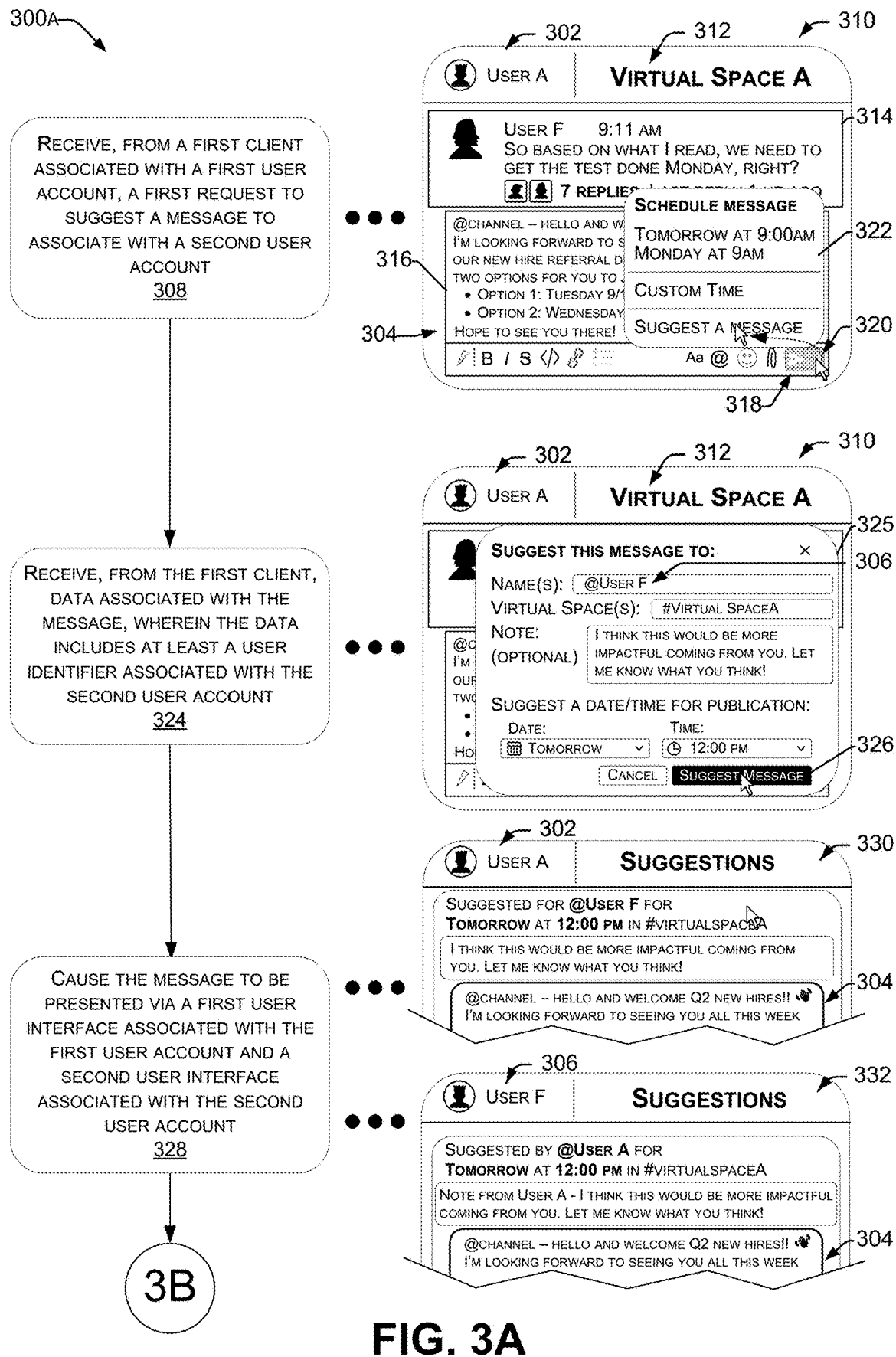
FIG. 3A illustrates an example process for generating, by a first user, a suggested message for a second user to adopt for publication via a communication platform.

FIG. 3A illustrates an example process 300a for generating, by a first user 302, a suggested message 304 for a second user 306 to adopt for publication via a communication platform. At operation 308, the communication platform receives, from a first client associated with the first user 302, a first request to suggest a message to associate with a second user account. In the illustrative example, the first request can be received via a communication interface 310 associated with a virtual space 312. The communication interface 310 can include an interface that enables interaction with the virtual space 312, such as drafting messages to be posted to the virtual space 312, such as posted message 314.

In various examples, the communication interface 310 can include a message input section 316 via which the first user 302 can input a message to post to the virtual space. In various examples, the message input section 316 can include a direct post control 318 that can enable the message to be published via the virtual space 312. In such examples, in response to receiving an indication of selection of the direct post control 318, the communication platform can cause the message drafted in the message input section 316 to be presented as a posted message, such as posted message 314.

In various examples, the message input section 316 can include an options control 320 that, when selected by the first user 302, can cause a presentation of an options window 322. The options window 322 can include one or more options associated with a publication or delivery of the message drafted in the message input section 316. In some examples, the option(s) can include a scheduling option, to schedule a delivery of the drafted message for a time in the future. In the illustrative example, the scheduling option can include suggested times for delivery provided by the communication platform. In such an example the communication platform can be configured to identify one or more optimal times for publishing a message via the virtual space 312. In some examples, the communication platform can determine the optimal time based on user interactions with the virtual space 312, such as based on a time when a members of the virtual space 312 regularly access data and/or interact with the virtual space 312.

In various examples, the options window 322 can include an option to input a custom time for delivery. In such examples, the communication platform can enable the first user 302 to input a specific date and/or time for publication of the drafted message. In at least one example, the options window 322 can include an option to suggest a message to another user. In various examples, the first request can be received in response to a selection, by the first user 302, of the option to suggest the message to another user. Additionally or alternatively, the first user 302 can suggest a message to another user via a suggestions interface (e.g., suggestions interface 212), such as by selecting a new message control associated therewith, such as the suggest a new message control 228.

At operation 324, the communication platform receives, from the first client, data associated with the suggested message 304, wherein the data includes at least a user identifier associated with the second user account of the second user. In various examples, in response to receiving an indication of selection of the option to suggest the message to another user, the communication platform can cause a presentation of a message data window 325, providing a means by which the first user can input the data. In various examples, the data can include additional data, as described above. For example, the data can include one or more user identifiers associated with one or more users to whom the first user 204 is providing the suggested message 304 for publication (e.g., second user 306), one or more virtual space identifiers associated with one or more virtual spaces designated for publication of the suggested message 304, a suggested date and/or time for the publication, and a note indicating why the first user 302 is suggesting the message. Though this is not intended to be so limiting and additional or alternative data can be input via the message data window 325.

In some examples, the message data window 325 can include a suggest message control 326. In response to receiving an indication of selection of the suggest message control 326, the communication platform can store the suggested message 304 and/or the data associated therewith in association with the first user account and/or the second user account (of the second user to whom the first user 302 suggests the suggested message 304. In some examples, the first request can be received in response to an indication of selection of the suggest message control 326. In such examples, the first request can include the suggested message 304 and data associated therewith.

At operation 328, the communication platform causes the suggested message 304 to be presented via a first user interface 330 associated with the first user account and a second user interface 332 associated with the second user account. In at least one example, the first user interface 330 and the second user interface 332 can include instances of a suggestions interface (e.g., suggestions interface 212), as described above. In various examples, the first user interface 330 and the second user interface 332 can provide a means by which the first user 302 and the second user 306 can interact with the suggested message 304. For example, the second user interface 332 can provide a means by which the second user 306 can approve, deny, and/or edit the suggested message. For another example, the first user interface 330 can provide a means by which the first user 302 can edit the suggested message 304, such as in an independent edit and/or a collaborative edit thereof. For yet another example, the first user interface 330 can provide updates to the first user 302 associated with a status of the suggested message 304. That is, the communication platform can update the first user interface 330 based on interaction data associated with the second user 306 interacting with the second user interface 332, such as approving the suggested message, denying the suggested message, editing the suggested message, and/or the like.

Figure 3B:
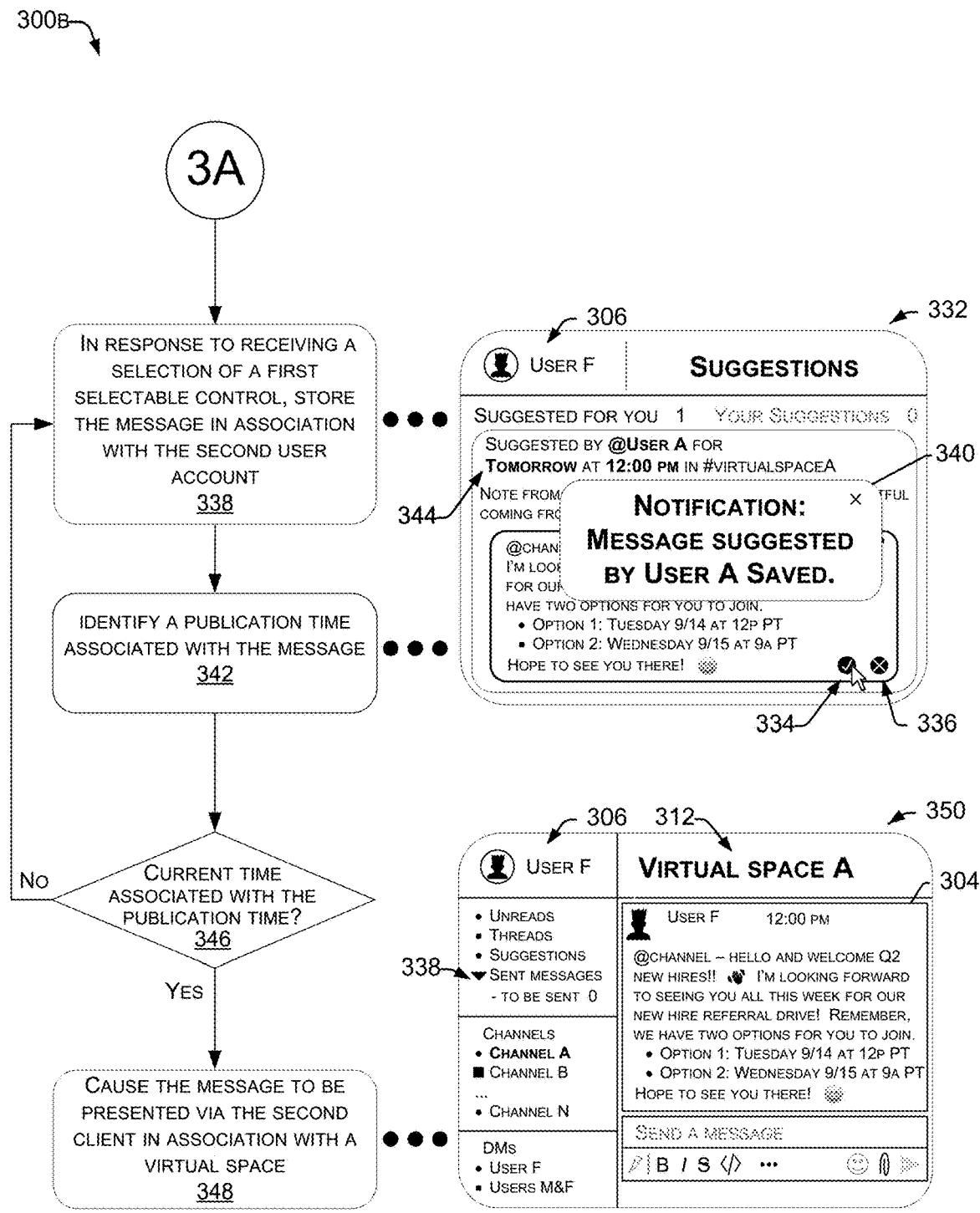
FIG. 3B illustrates an example process for providing a suggested message, generated by a first user, for a second user, and, in response to receiving an indication of acceptance of the suggested message, causing the suggested message to be transmitted in association with a user account of the second user.

FIG. 3B illustrates an example process 300b for causing the suggested message 304 generated by the first user 302 and suggested to the second user 306 to be transmitted in association with a second user account of the second user 306. As discussed above with respect to operation 328, the communication platform can cause the suggested message 304 to be presented to the second user 306 via the second user interface 332. In various examples, the second user interface 332 can include one or more selectable controls (e.g., affordances) associated with approving or denying the suggested message. For example, the second user interface 332 can include a first selectable control 334 (e.g., approve selectable control) associated with approving or adopting the suggested message 304 and a second selectable control 336 (e.g., decline selectable control) associated with denying an adoption of the suggested message 304.

At operation 338, in response to receiving a selection of the first selectable control 334, the communication platform can store the suggested message 304 in association with the second user account. In some examples, the communication platform can cause a notification 340 to be presented in response to receiving the indication of selection of the first selectable control 334. The notification 340 can provide the second user 306 with a confirmation that the suggested message 304 was saved. In various examples, the notification 340 can include an ephemeral notification. In such examples, the notification 340 can be presented via the second user interface 332 for a determined period of time (e.g., 2 seconds, 5 seconds, etc.). In the illustrative example, the notification 340 is illustrated as a pop up message. Though this is not intended to be so limiting and the notification 340 can be presented in an additional or alternative manner.

At operation 342, the communication platform identifies a publication time 344. The publication time can include a designated date and/or time associated with a publication of the suggested message 304. In some examples, the first user 302 can provide the publication time 344, such as in association with the request to provide the suggested message 304 (e.g., as additional data). In some examples, the second user 306 can input the publication time 344 in association with the suggested message via the second user interface 332, such as prior to an approval thereof.

At operation 346, the communication platform determines whether a current time is associated with the publication time 344. In some examples, the communication platform can determine whether the current time is within a threshold period of time (e.g., 1 minute, 5 seconds, 1 second, 0.5 seconds, etc.) of the publication time 344. In some examples, the threshold period of time can include a time period associated with transmitting data via the communication platform. That is, the threshold period of time can enable the suggested message 304 to be presented via the designated virtual space(s) at the publication time 344.

Based on a determination that the current time is not associated with the publication time 344 ("No" at operation 346), the communication platform continues to store the message in association with the second user account, as described with respect to operation 338. Based on a determination that the current time is associated with the publication time 344 ("Yes" at operation 346), the communication platform, at operation 348, causes the message to be presented via the second client in association with the designated virtual space (e.g., virtual space 312), such as via a communication interface 350. In some examples, in response to determining that neither the first user 302 or the second user 306 input a designated time for publication, the communication platform can determine that the publication time 344 is associated with an approval of the suggested message. That is, in response to receiving an indication of selection of the first selectable control 334, the communication platform can identify a current time as the publication time 344, and can cause the message to be presented in association with the virtual space 312, via the communication interface 350.

In various examples, the communication interface 350 can include another instance of the communication interface 310 described above and configured to present data associated with one or more virtual spaces (e.g., Virtual Space A), such as one or more published messages. As described above, a message can refer to any electronically generated digital object provided by a user using a client and that is configured for display within a virtual space (e.g., channel, a direct message, board, etc.). In some examples, messages can be associated with file(s), emoji(s), reactji(s), application(s), and/or the like.

Although not illustrated, the virtual space, such as virtual space 312 presented via the communication interface 350 and/or the communication interface 310 can include data and/or content other than messages, or data and/or content that is associated with messages. Non-limiting examples of additional data and/or content that can be presented in association with the virtual space can include members added to and/or removed from the virtual space, file(s) (e.g., documents generated within a virtual space, file attachment(s)) uploaded and/or removed from the virtual space, application(s) added to and/or removed from the virtual space, post(s) (data that can be edited collaboratively, in near real-time by one or members of a virtual space) added to and/or removed from the virtual space, description added to, modified, and/or removed from the virtual space, modifications of properties of the virtual space, etc.

In some examples, the communication interface 350 and/or the communication interface 310 can include a feed associated with a single virtual space (e.g., channel, direct message instance, board, etc.). In such examples, data associated with the virtual space can be presented via the feed. In at least one example, data associated with a virtual space can be viewable to at least some of the users of a group of users associated with a same group identifier. In some examples, for members of a virtual space, the content of the virtual space (e.g., messaging communications and/or objects) can be displayed to each member of the virtual space. For instance, a common set of group-based messaging communications can be displayed to each member of the virtual space such that the content of the virtual space (e.g., messaging communications and/or objects) may not vary per member of the virtual space. In some examples, messaging communications associated with a virtual space can appear differently for different users (e.g., based on personal configurations, group membership, permissions, policies, etc.). For example, messaging communications associated with the virtual space 312 can appear differently on the communication interface 350 and the communication interface 310.

In at least one example, the communication platform can be configured to update a sent items indicator and/or virtual space associated therewith, to reflect the publication or presentation of the suggested message 304 via the virtual space 312. That is, after causing the presentation of the suggested message 304 via the virtual space 312, the communication platform can provide an indication that the suggested message was published, thereby enabling the second user to quickly and efficiently access a confirmation that the message was published at the publication time 344, without having to search for the message posted in the virtual space 312. By reducing a search time associated with confirming a publication of the suggested message 304, the techniques described herein can improve one or more functions of the user computing device associated with the second user 306 (e.g., the second client).

FIGS. 4A-4D illustrate example user interfaces in which a first user 402 can submit a request to suggest a message 404 (e.g., suggested message 304) for a second user 406, which may be collaboratively edited by the first user 402 and the second user 406 prior to publication.

Figure 4A:
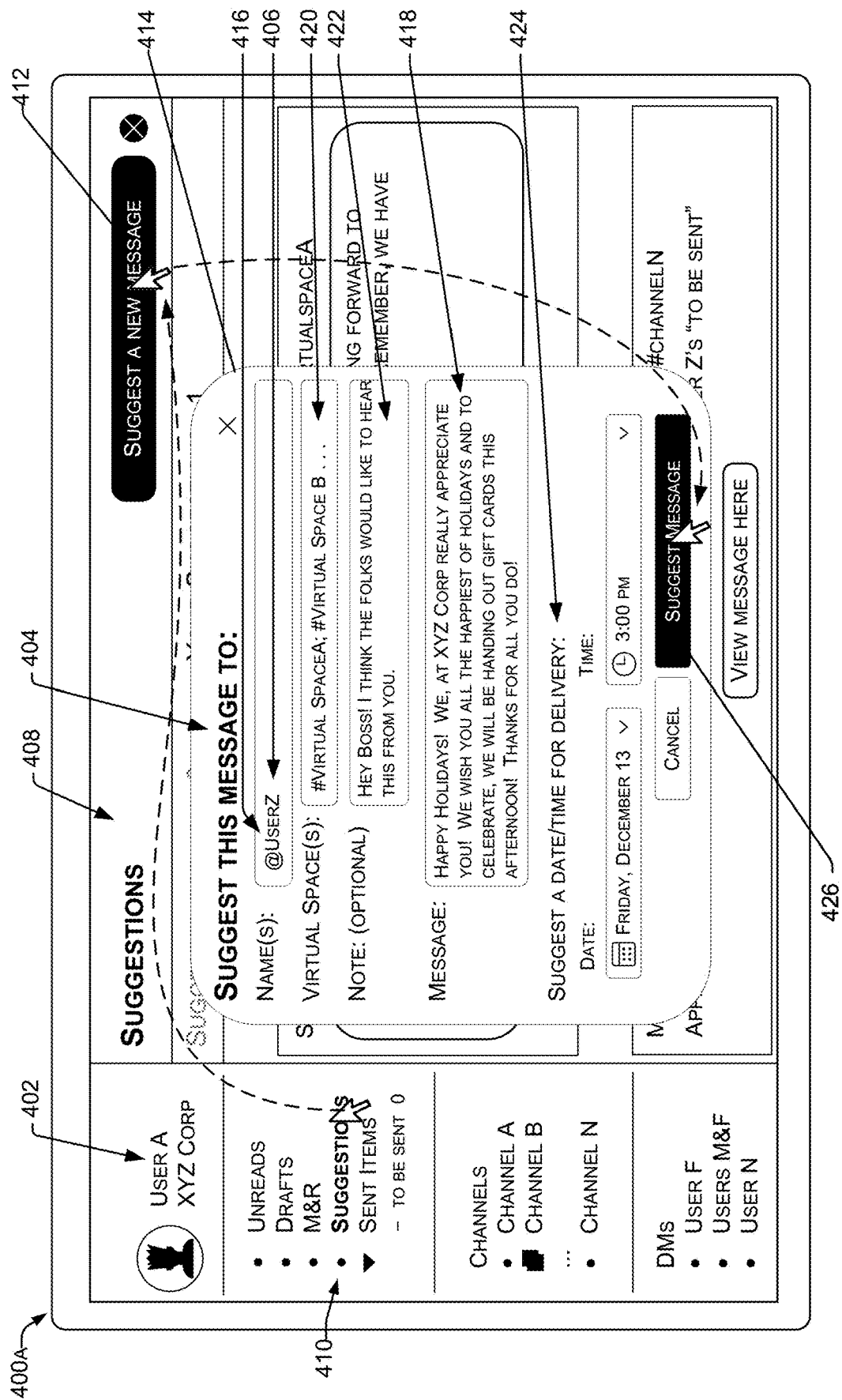
FIG. 4A illustrates an example user interface in which a first user can suggest a new message for a second user to send, as described herein.

FIG. 4A illustrates an example user interface 400a, wherein a suggestions interface 408, such as suggestions interface 144 and/or suggestions interface 212, is presented. In at least one example, the communication platform can cause a presentation of the suggestions interface 408 in response to receiving an indication of selection of a suggestions indicator 410 (or affordance) via the user interface 400a. As discussed above, the suggestions interface 408 can include data associated with one or more suggested messages that are associated with a first user account of the first user 402. The suggested message(s) can include messages that are suggested to the first user 402 by another user with whom the first user 402 is connected via the communication platform and/or messages that the first user 402 suggests to one or more other users. A connection via the communication platform can include a relationship (e.g., relation, friendship, contact, etc.), a common association (e.g., associated with a same organization, group, etc.), or other connection between two users of a communication platform. In at least one example, the connection can include an association with at least one of a same organizational identifier, group identifier, or virtual space identifier.

In the illustrative example, the suggestions interface 408 includes a new message control 412, such as new message control 228, that is configured to enable the first user 402 to suggest a new message to another user of the communication platform. That is, by selecting the new message control 412, the first user 402 can initiate a request to suggest a new message to be published in association with another user account of another user. In various examples, in response to receiving an indication of selection of the new message control 412, the communication platform can cause a message data window 414, such as message data window 325 to be presented via the suggestions interface 408.

In at least one example, the message data window 414 can provide a means by which the first user 402 can input data associated with the new message to suggest to another user for publication. In at least one example, the data includes at least a user identifier 416 associated with the second user 406 (e.g., second user, receiving user) to whom the message is to be suggested and contents 418 associated with the new message. In the illustrative example, the user identifier 416 include a mention of the username of the second user 406, however, this is not intended to be so limiting, and the user identifier can include one or more of a name (e.g., username, real name, etc.), a mention, a tag, and/or other identifier by which the communication platform can identify the second user 406. In various examples, the contents 418 can include text, images, audio and/or video files, GIFs, emojis, file attachments, links, and/or the like. That is, the contents 418 can include any type of data capable of inclusion in or association with a message.

In various examples, the data can include one or more virtual space identifiers 420 associated with suggested virtual spaces for publication of the new message. That is, the first user 402 can provide the suggested virtual space(s) via which the new message should be published. In some examples, the data can include a note 422. In such examples, the note 422 can provide a means by which the first user 402 can explain why the new message is being suggested and/or provide additional information about the new message.

In at least one example, the data can include a suggested publication time. The publication time 424 can include a suggested date and/or time for publication of the message (e.g., delivery via the designated virtual space(s). In some examples, the publication time 424 can include a determined or perceived optimal delivery time associated with the message. In some examples, in absence of a publication time 424, such as if the date and/or time are left blank, the communication platform can determine that a time associated with approval of the new message (e.g., by the second user 406) is the publication time 424. That is, in response to a determination that no publication time 424 is associated with the new message, the communication platform can cause the new message to be published immediately in response to receipt of an approval or adoption thereof by the second user 406.

In at least one example, the message data window 414 can include a suggest message control 426 that, when selected by the first user 402, send the request to suggest the new message to the communication platform, such as to the suggestions component 116 associated with server(s) 102. In response to receiving the indication of selection of the suggest message control 426 and/or the data associated with the new message, the communication platform can cause an instance of the new message to be presented via another instance of the suggestions interface 408 that is associated with the second user 406.

Figure 4B:
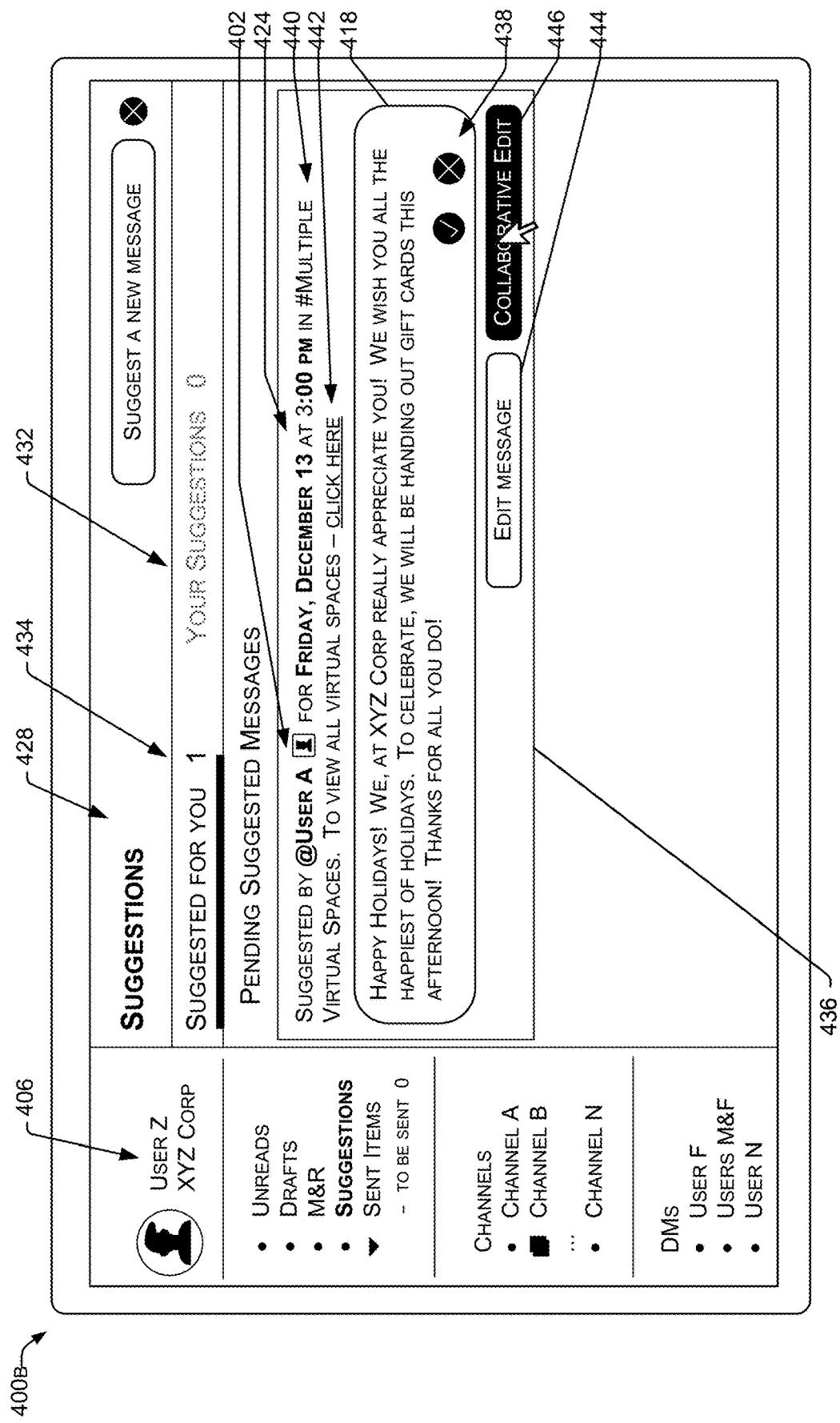
FIG. 4B illustrates an example user interface in which a recipient of a suggested message can interact with the suggested message, as described herein.

FIG. 4B illustrates an example user interface 400b in which a second suggestions interface 428 (e.g., second instance of the suggestions interface) associated with the second user 406 (e.g., the receiving user) is presented. As discussed above, the second suggestions interface 428 can include one or more messages that are suggested to the second user 406 (by another user, such as the first user 402) for publication in association with a second user account of the second user 406 and/or one or more messages that are suggested by the second user 406 for publication in association with a user account of another user. As discussed above with regard to FIG. 2, the message(s) suggested by the second user 406 can be presented in association with a suggestions section 432, such as suggestions section 220.

In some examples, the message(s) suggested to the second user 226, such as the new message described with respect to FIG. 4A, can, in some examples, be presented in association with a suggested messages section 434, such as suggested message section 218. For example, and as illustrated in FIG. 4B, the suggestions messages section 434 includes a new message indicator 436 including the new message described above. In the illustrative example, the new message indicator 436 is presented in association with pending suggested messages, such as to provide an indication to the second user 406, at a glance, that the new message associated with the new message indicator 436 has not yet been approved.

In various examples, the new message indicator 436 can include data associated with the new message, such as to provide the second user 406 with sufficient information to inform a decision as to whether to approve or decline adoption of the new message, such as via selectable controls 438 (e.g., first selectable control 334 and/or second selectable control 336). As non-limiting examples, the data can include the contents 418 of the new message, an identifier associated with the suggesting user (e.g., first user 402), a publication time 424, and an indicator 440 associated with one or more virtual spaces via which the new message is to be published (e.g., responsive to approval thereof). In some examples, the indicator 440 can include a list of identifiers or names associated with the virtual spaces. In the illustrative example, the indicator 440 provides an indication that the multiple virtual spaces (e.g., more than one virtual space) are associated with the new message. In some examples, the new message indicator 436 can include a selectable control 442 that, when selected by the second user 406, can cause a presentation of a list of the virtual spaces associated with the new message. In some examples, the list can be configured to enable the second user 406 to add or remove an association with select suggested virtual spaces from the new message. That is, the second user 406 can associate additional or alternative virtual spaces with the new message.

Additionally or alternatively, the second user 406 can modify an association of a virtual space with the new message and/or other data associated with the new message via a first edit control 444 and/or a second edit control 446. In various examples, the first edit control 444 can enable the second user 406 to modify the contents 418 of the message and/or other data associated therewith (e.g., virtual spaces, publication time 424, etc.) independently of the first user 402. That is, in response to receiving an indication of selection of the first edit control 444, the communication platform can cause an editing interface to be presented via the second suggestions interface 428, enabling the second user 406 to modify data associated with the new message before approval and/or adoption thereof.

Figure 4C:
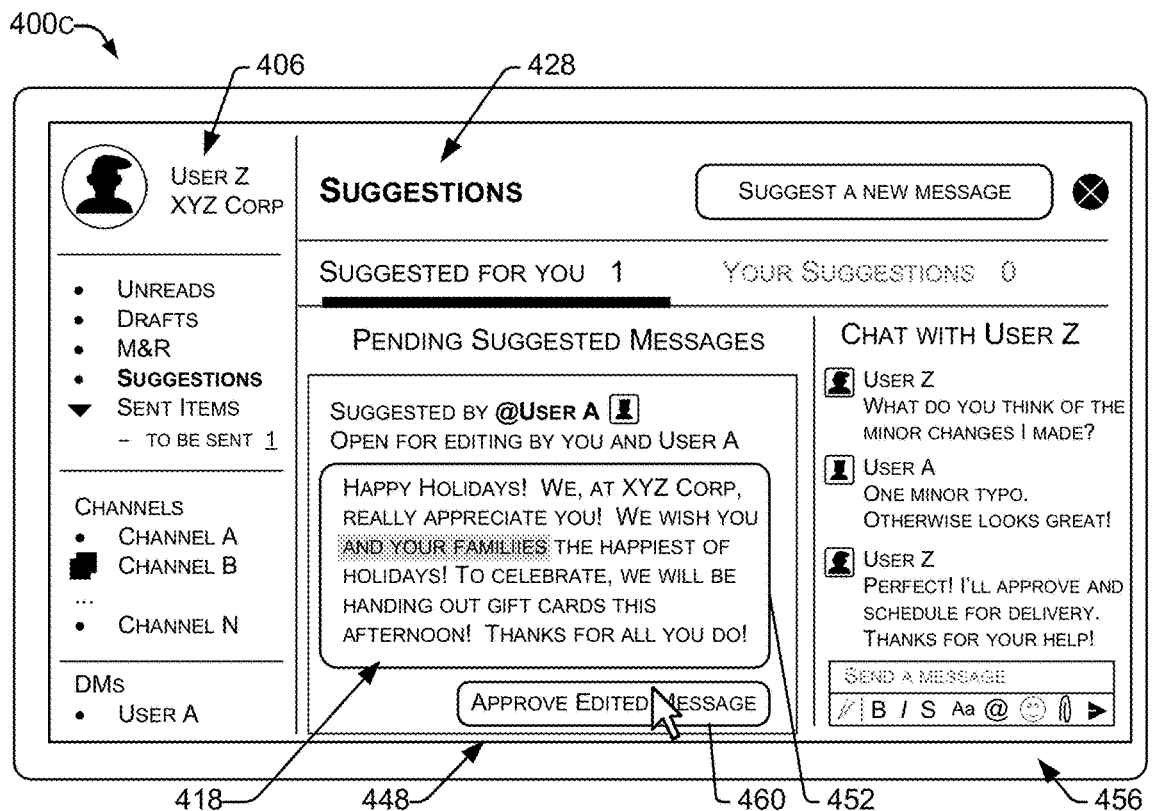
FIGS. 4C and 4D illustrate the example user interfaces of FIGS. 4A and 4B, respectively, in which the first user and the second user can collaboratively edit a suggested message, as described herein.

The second edit control 446 can enable the second user 406 to modify the contents 418 of the message and/or other data associated therewith in a collaborative editing session, such as between the first user 402 and the second user 406. In some examples, the collaborative editing session can be real-time or near real-time and/or asynchronous (e.g., edits by different users occurring at different times). In some embodiments, selection of collaborative edit button 446 causes a collaborative interface to be displayed such as a collaborative document 460 where each user can edit the message and the edits are tracked so that each edit is associated with a corresponding user who made the edit. In some embodiments, a direct message user interface 456 is displayed where the first user and second user may discuss the edits. In some embodiments, the direct message user interface and the collaborative editing interface may be displayed side by side as illustrated in FIG. 4C. Though described herein primarily as a collaboration session between the first user 402 (e.g., suggesting user) and the second user (e.g., receiving user), this is not intended to be so limiting, and the collaboration session can include one or more other users, such as other users invited to the collaboration session by the first user 402 and/or the second user 406. In various examples, collaborative editing of the message can be performed utilizing techniques such as those described in U.S. patent application Ser. No. 17/234,137, filed Apr. 19, 2021, and entitled "Draft Message Object Collaboration in a Group-Based Communication Platform" the entire contents of which are incorporated herein by reference.

In at least one example, in response to receiving an indication of selection of the second edit control 446, the communication platform can cause an editing interface to be presented in association with the suggestions interface 408 and/or the second suggestions interface 428.

Figure 4D:
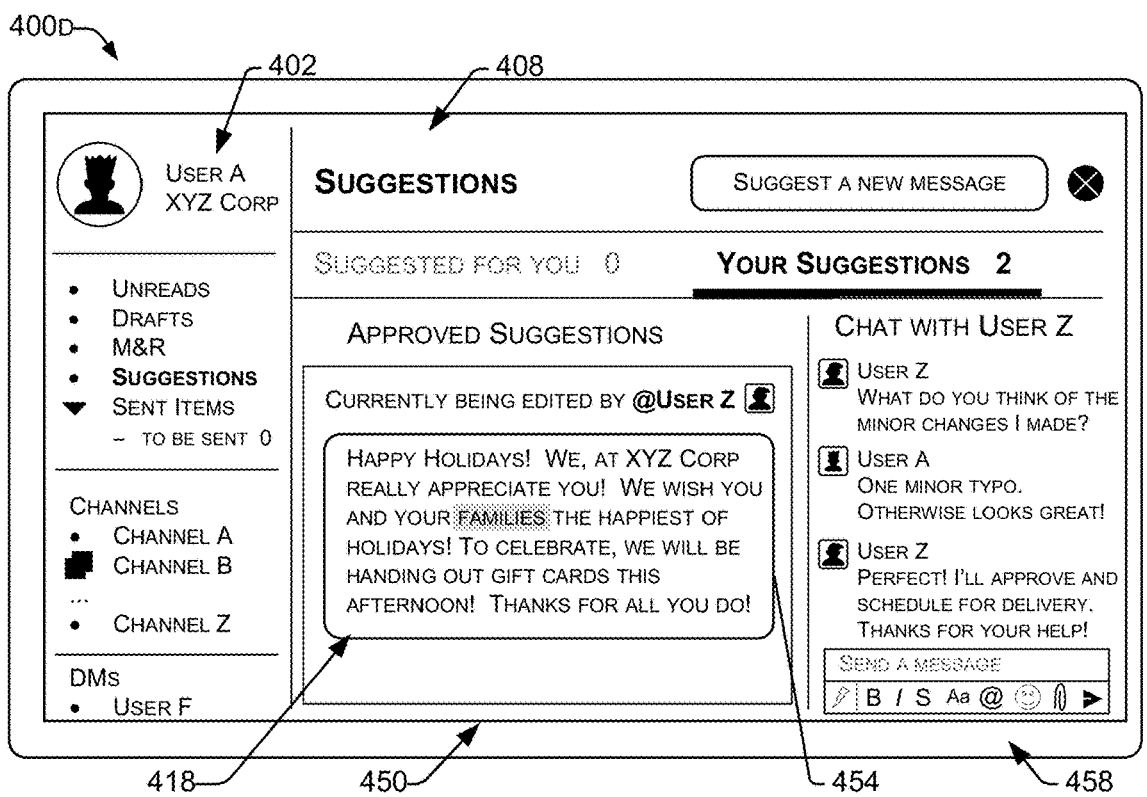

FIGS. 4C and 4D illustrate example user interfaces 400c and 400d, respectively, in which an editing interface 448 is associated with the second suggestions interface 428 associated with the second user 406 and an editing interface 450 is associated with the suggestions interface 408 associated with the first user 402. In the illustrative example, the editing interface 448 includes a message edit section 452 and the editing interface 450 includes a message edit section 454 via which the second user 406 and the first user 402, respectively, can modify and concurrently view modifications associated with the contents 418 of the new message. In various examples, sections or portions of the contents 418 can be locked for editing based on an input associated therewith from either the first user 402 or the second user 406. For example, while the second user 406 edits the contents 418 to include "and your families," the communication platform can lock the sentence "we wish you and your families the happiest of holidays" from concurrent editing by the first user 402. As such, the communication platform can prevent simultaneous editing of the same portion of the contents 418.

In various examples, the communication platform can provide an indication of a portion or section of the contents 418 that is currently being edited. In some examples, the indication can include a highlight, bolding, underline, or any other way to provide an indication to the editing user and the other user that the section or portion of the contents 418 is currently being edited. For example, the second user adds "and your families" to the editing interface 448, which is represented in highlighted font to indicate the current edit.

In various examples, the editing interface 448 and the editing interface 450 can additionally include respective communication interfaces 456 and 458 associated with a communication instance, configured to enable the second user 406 and the first user 402 to send messages back and forth regarding the edits. In some examples, the communication interfaces 456 and 458 can be represented as comments associated with particular edits, such as a first comment box associated with a first edit, a second comment box associated with a second edit, and/or the like. In the illustrative example, the communication interfaces 456 and 458 associated with the editing interfaces 448 and 450, respectively, are presented in a split screen, or bifurcated view, concurrently with the message edit sections 452 and 454. In such an example, the first user 402 and the second user 406 can concurrently view one another's edits and messages sent via the communication instance.

In various examples, the communication instance can include a means for communication between the first user 402 and the second user 406 in association with the new message. In some examples, the communication instance can be stored in association with the new message and/or in association with user accounts of the first user and/or the second user. In some examples, the communication instance may be deleted after a completion of the editing session. In such examples, the communication instance may be deleted in response to receiving an indication of selection of an approve edited messages control 460 associated with the editing interface 448. That is, in response to receiving a final approval of the edited contents 418, the communication channel can purge data associated with the communication instance corresponding to the editing session.

In various examples, the communication instance can be configured to enable the first user 402 and/or the second user 406 to invite one or more other users to collaboratively edit the suggested message. In at least one example, the first user 402 and/or the second user 406 can mention, tag, or otherwise include an identifier of another user (e.g., a third user) in a message of the communication instance. In response to determining that the message of the communication instance includes the identifier (e.g., @mention, tag, etc.), the communication platform can send an invitation to the third user to join the communication instance and/or the collaborative edit of the suggested message. For example, the first user 402 can draft a first message including a mention of @thirduser. Based on the identification of the @mention in the first message, the communication platform can send the third user an invitation to join the collaborative edit of the suggested message and/or the communication instance. Though described in the example as an @mention, this is not intended to be so limiting and the first user 402 and/or the second user 406 can tag, mention or otherwise initiate an invitation workflow for the third user to join the collaborative edit utilizing any other symbol, such as a !, *, &, and/or the like.

In response to receiving an indication of denial of the invitation (e.g., declined invitation), the communication platform can withhold an association of the third user account (e.g., third user) from the collaborative edit and/or the communication instance. That is, the first user 402 and the second user 406 can be the members in the collaborative edit and/or communication instance. In response to receiving an indication of acceptance of the invitation, the communication platform can associate the third user account (e.g., the third user, identifier associated with the third user) with the collaborative edit and/or the communication instance, thereby enabling the third user to participate in the collaborative edit of the suggested message and/or send communication instance messages to the first user 402 and the second user 406 via the communication instance. Additionally, the communication platform can an editing interface, such as editing interfaces 448 and 450 and/or a communication interface, such as communication interfaces 456 and 458, to be presented in association with the third user account. In some examples, the communication platform can include an instance of the suggested message in a suggestions interface associated with the third user. In various examples, the third user can access the instance of the suggested message, the editing interface, and/or the communication interface via the suggestions interface.

In various examples, in response to receiving the indication of selection of the approve edited messages control 460, the communication platform can determine that the editing is complete and can store a modified version of the suggested message in a datastore associated with the communication platform. In some examples, the communication platform can publish the edited contents 418 (e.g., modified message) via the designated virtual spaces or save the edited contents 418 for publication at a future time (e.g., the publication time). In various examples, in response to receiving the indication of selection of the approve edited messages control 460, the communication platform can store the edited contents 418 in association with the second user account of the second user 406 and/or in association with the first user account of the first user 402. In at least one example, the communication platform can update the suggestions interface 408 and the second suggestions interface 428, to reflect the approval of the message. For example, the suggestions interface 408 and/or the second suggestions interface 428 can be modified to include a "approved—pending publication" label or another label associated with the new message to indicate that the new message has been approved, but not yet published. For another example, the suggestions interface 408 and/or the second suggestions interface 428 can be modified to include a "approved—delivered" label or another label associated with the new message to indicate a delivery or publication thereof.

FIGS. 1-4D make reference to "controls" or "indicators" which can include user interface elements or affordances that can include any element of the user interface that is representative of an object, message, virtual space, and/or the like. A control or indicator can include a text element, a graphical element, a picture, a logo, a symbol, and/or the like. In at least one example, individual controls or indicators can be associated with actuation mechanisms. Such actuation mechanisms can make the corresponding controls or indicators selectable or otherwise interactable. That is, actuation of an actuation mechanism as described herein can, in some examples, indicate a selection of a corresponding control or indicator. In at least one example, the application 140 can receive an indication of an interaction with a control or indicator (e.g., indication of a selection and/or actuation of an actuation mechanism) and can send an indication of such to the server(s) 102. In some examples, the server(s) 102 can send data and/or instructions to the application 140 to generate new user interfaces and/or update associated user interfaces (e.g., suggestion user interfaces), as described herein.

The example user interfaces and controls described above are provided for illustrative purposes. In some examples, such user interfaces and controls can include additional or alternative data, which can be presented in additional or alternative configurations. That is, the user interfaces and user interface elements should not be construed as limiting.

Figure 5:
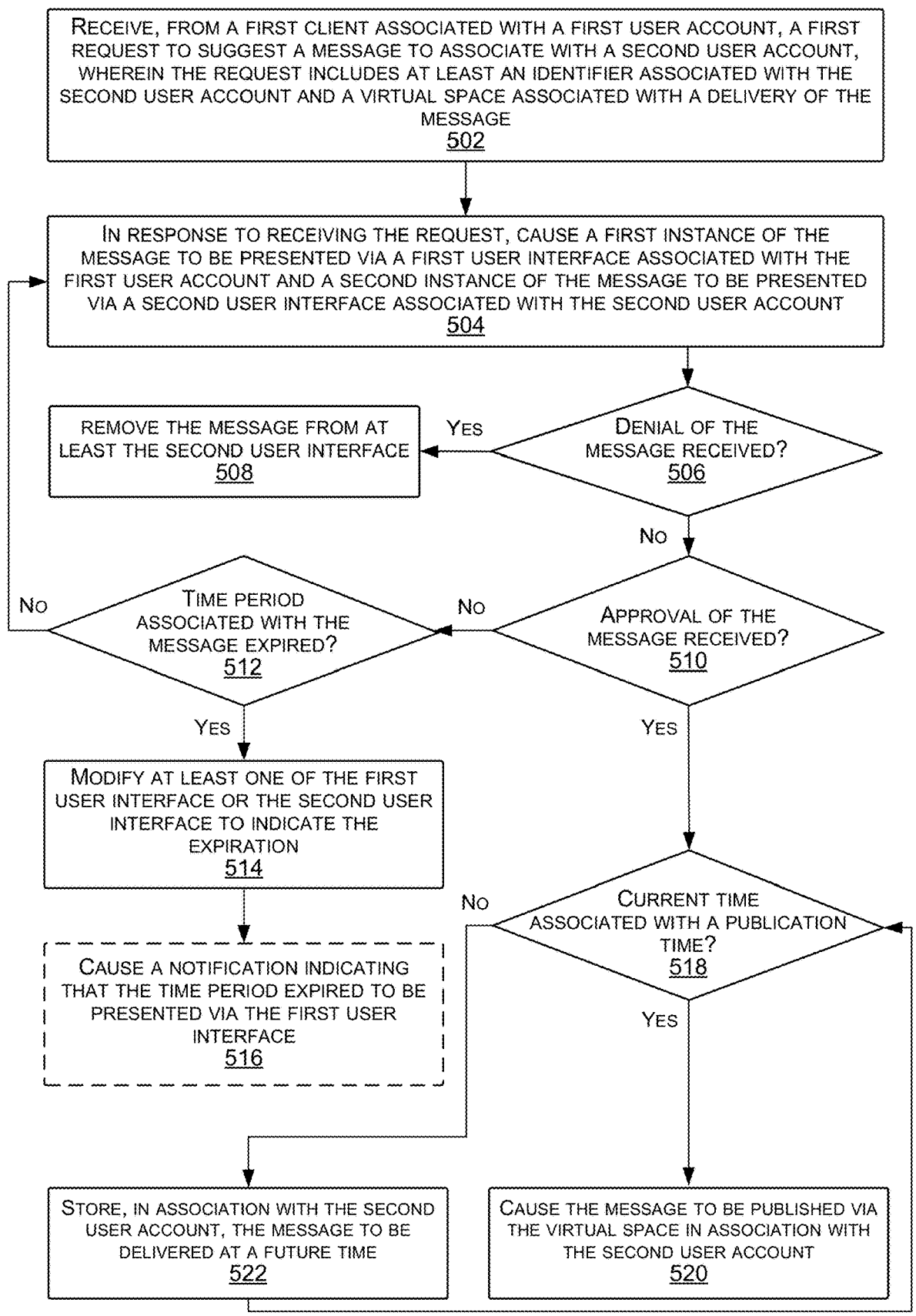
FIG. 5 illustrates an example process for publishing a suggested message in association with a user account, as described herein.
Figure 6:
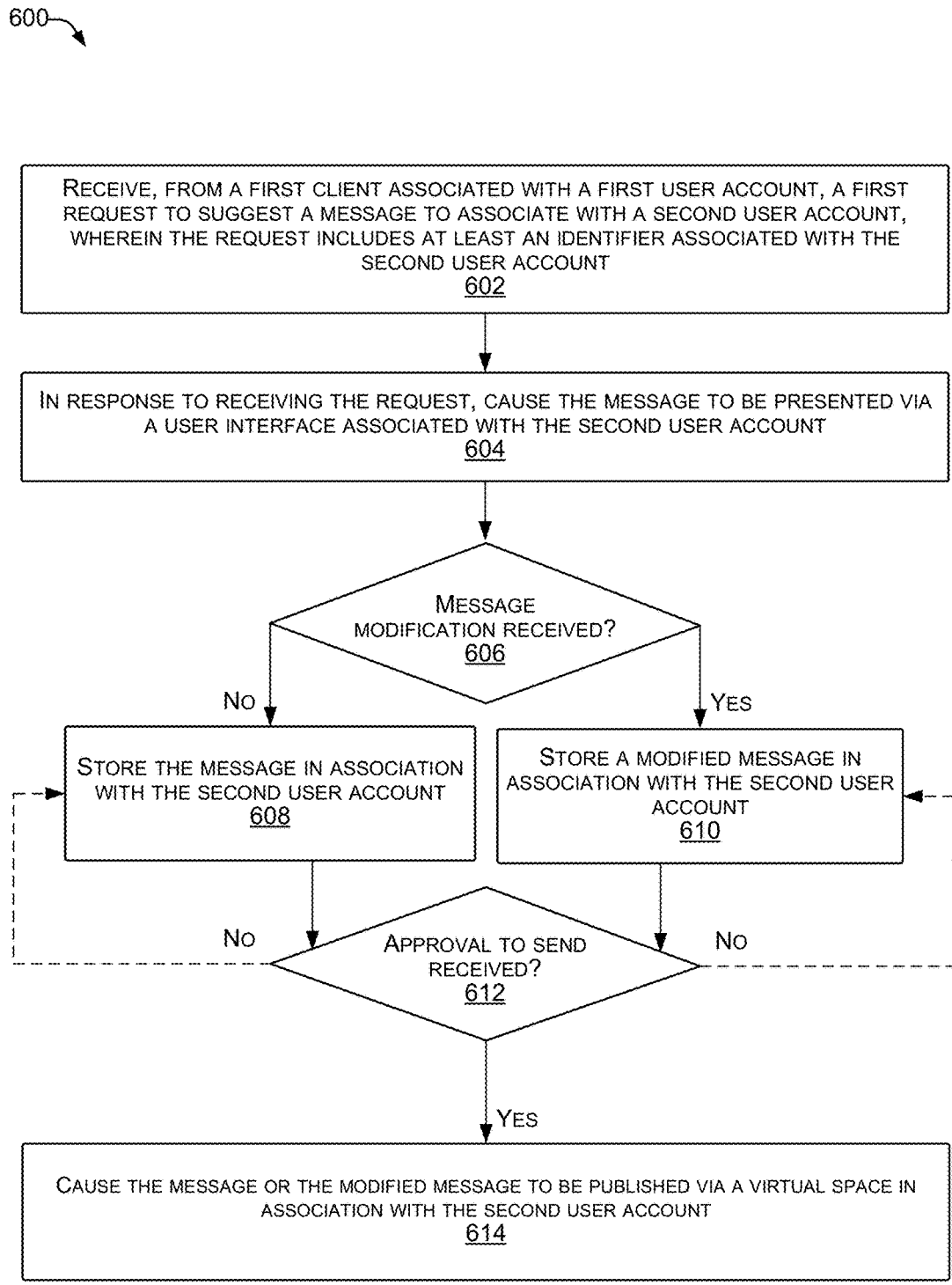
FIG. 6 illustrates an example process for publishing one of a suggested message or a modified suggested message in association with a user account, as described herein.

FIGS. 5 and 6 are flowcharts showing example processes involving techniques as described herein. The processes illustrated in FIGS. 5 and 6 are described with reference to components of the environment 100 shown in FIG. 1 for convenience and ease of understanding. However, the processes illustrated in FIGS. 5 and 6 are not limited to being performed using the components described above with reference to the environment 100. Moreover, the components described above with reference to the environment 100 are not limited to performing the processes illustrated in FIGS. 5 and 6.

The processes in FIGS. 5 and 6 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, message objects, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes in FIGS. 5 and 6 can be combined in whole or in part with each other or with other processes.

FIG. 5 illustrates an example process 500 for publishing a suggested message in association with a user account, as described herein.

At operation 502, the communication platform receives, from a first client associated with a first user account, a first request to suggest a message to associate with a second user account, wherein the request includes at least an identifier associated with the second user account and a virtual space associated with a delivery of the message. As discussed above, the request can be received in association with a drafted message associated with a virtual space and/or via a suggestions interface, such as suggestions interface 408, etc.

In various examples, the request to suggest the message can include contents of the message (e.g., text, emojis, images, audio and/or video files, GIFs, file attachments, etc.), a user identifier associated with the second user account, one or more virtual space identifiers associated with virtual spaces corresponding to a suggested publication of the message, a publication time (e.g., date and/or time associated with the publication of the message), a personal note from the first user to the second user, and/or other data associated with the message.

At operation 504, in response to receiving the request, the communication platform causes a first instance of the message to be presented via a first user interface associated with the first user account and a second instance of the message to be presented via a second user interface associated with a second user account. In various examples, the first user interface and the second user interfaces can include suggestions interfaces associated with the first user and the second user, respectively (e.g., suggestions interface 408 and suggestions interface 428). In at least one example, the first instance of the message can be presented in association with a suggestions section, such as suggestions section 220, of the first interface, and the second instance of the message can be presented in association with a suggested messages section, such as suggested messages section 218, of the second interface. That is, the first instance of the message can be presented as a message that is suggested by the first user to another user and the second instance of the message can be presented as a message that is suggested to the second user by another user (e.g., the first user).

At operation 506, the communication platform determines whether an indication of denial (e.g., disapproval, denied association, etc.) of the message has been received via the second user interface. That is, the communication platform determines whether the second user declines to adopt the message for publication in association with the second user account. In various examples, the indication of denial of the message can be received in response to a selection, by the second user, of a decline selectable control (e.g., second selectable control 336) presented in association with the message via the second user interface.

Based on a determination that the indication of denial is received ("Yes" at operation 506), the communication platform, at operation 508, removes the message from at least the second user interface. That is, the communication platform modifies the second user interface by removing an instance of the message presented thereon. In some examples, the communication platform can remove the message, but can cause a presentation of an indicator associated with the message and the denial thereof. That is, the communication platform can update the second user interface to reflect that the message was suggested to the second user, and that the second user denied the message, such as with a timestamp associated with the denial, and/or data associated with the message.

Based on a determination that the indication of denial is not received ("No" at operation 506), the communication platform, at operation 510, the communication platform determines whether an indication of approval of the message is received via the second user interface. The approval of the message can indicate an adoption, by the second user, of the message for publication in association with the second user account. In various examples, the indication of approval of the message can be received via an approve selectable control (e.g., first selectable control 334) presented via the second user interface in association with the message. That is, the indication of approval can be received in response to selection, by the second user, of the approve selectable control associated with the message.

Based on a determination that the indication of approval is not received ("No" at operation 510), the communication platform, at operation 512, determines whether a time period associated with the message is expired. In some examples, the time period can be determined based on a user preference associated with the first user account or the second user account or an organizational preference associated with an organization of the first user and/or the second user. For example, the first user or the second user may set, as a preference, that any suggested messages that are not approved or denied within a first period of time (e.g., 48 hours, 72 hours, one week, etc.) should be removed from view via a suggestions interface. Based on a determination that the time period has not expired ("No" at operation 512), the communication platform continues to cause the first instance of the message to be presented via the first user interface and the second instance of the message to be presented via the second user interface, as described with regard to operation 504.

Based on a determination that the time period has expired ("Yes" at operation 512), the communication platform, at operation 514, the communication platform modifies at least one of the first user interface or the second user interface to indicate the expiration of the time period. In various examples, a modification to the at least one of the first user interface or the second user interface can include an indication that the second user did not respond prior to an expiration of the message and/or that the second instance of the message is no longer active. That is, the modification to the at least one of the first user interface or the second user interface can inform the first user and the second user as to an expired status of the message. In some examples, in response to determining that the time period has expired, the communication platform can remove the second instance of the message from the second user interface. That is, based on a determination that the message was available for approval and ignored by the second user for the duration of the time period, the communication platform can remove the second instance of the message from the second user interface. In some examples, the communication platform can additionally delete the second instance of the message from a datastore associated with the second user account.

In some examples, the communication can optionally, at operation 516, cause a notification indicating that the time period expired to be presented to the first user via the first user interface. That is, in addition to the modification to the first user interface, the communication platform can present a notification or alert (e.g., pop-up notification, overlay notification, etc.) to be presented to inform the first user about the expired status of the message.

Based on a determination that the indication of approval is received ("Yes" at operation 510), the communication platform, at operation 518 determines whether a current time is associated with a publication time associated with the message. The publication time can include a designated date and/or time for publication of the message in association with the second user account. As discussed above, the publication time can be provided by the first user, such as in the request to suggest the message to the second user. In some examples, the publication time can additionally be provided by the second user. In some examples, the publication time provided by the second user can include a modification to an originally suggested publication time (e.g., as provided by the first user). In some examples, the second user can associate a publication time with the message. In at least one example, the second user can input and/or edit the publication time in association with an approval of the message for association with the second user account.

In some examples, the communication platform can determine that the message does not have an associated publication time (e.g., no specific date and/or time designated for delivery). In such examples, the communication platform can determine that the current time (e.g., time associated with approval of the message) is associated with the publication time.

Based on a determination that the current time is associated with the publication time ("Yes" at operation 518), the communication platform, at operation 520, causes the message to be published via the virtual space in association with the second user account. In at least one example, the message is published or posted to the virtual space with an indication that the message was published or posted by the second user.

Based on a determination that the current time is not associated with the publication time ("No" at operation 518), the communication platform, at operation 522, stores, in association with the second user account, the message to be delivered at a future time, the future time corresponding to the publication time. In various examples, the communication platform can continue to monitor the current time versus the publication time until determining that a current time is associated with the publication time. In various examples, the communication platform can evaluate the current time with respect to the publication time at periodic intervals (e.g., every minute, every hour, etc.). In some examples, the communication platform can evaluate the current time versus the publication time based on a determination that a current date is associated with the publication time. In such examples, the communication platform can limit the evaluation to a date associated with the publication, thereby saving computing resources associated therewith.

FIG. 6 illustrates an example process 600 for publishing one of a suggested message or a modified suggested message in association with a user account, as described herein.

At operation 602, the communication platform receives, from a first client associated with a first user account, a first request to suggest a message to associate with a second user account, wherein the request includes at least an identifier associated with the second user account. As discussed above, the request can be received in association with a drafted message associated with a virtual space and/or via a suggestions interface, such as suggestions interface 408, etc.

In various examples, the request to suggest the message can include contents of the message (e.g., text, emojis, images, audio and/or video files, GIFs, file attachments, etc.), a user identifier associated with the second user account, one or more virtual space identifiers associated with one or more virtual spaces corresponding to a suggested publication of the message, a publication time (e.g., date and/or time associated with the publication of the message), a personal note from the first user to the second user, and/or other data associated with the message.

At operation 604, in response to receiving the request, the communication platform causes the message to be presented via a user interface associated with the second user account. In various examples, the user interface can include a suggestions interface associated with the second user, such as suggestions interface 428. In at least one example, the message can be presented in association with a suggested messages section, such as suggested messages section 218, of the user interface. That is, the message can be presented as a message that is suggested to the second user by another user (e.g., the first user). Additionally, the communication platform can cause the message to be presented via another user interface associated with the first user account (e.g., suggestions interface 408).

At operation 606, the communication platform determines whether a modification to the message is received. As discussed above, the communication platform can enable the second user to edit the message, such as via an editing interface. The edit can include an independent edit (e.g., second user independent of the first user), and/or a collaborative edit between the second user and the first user, such as that described above with regard to at least FIGS. 4C and 4D. In various examples, a modification to the message can include a modification to the contents of the message, a virtual space via which the message will be published, a publication time associated with the message, and/or the like.

Based on a determination that the modification to the message is not received ("No" at operation 606) the communication platform can store the message in association with the second user account. The modification can be received from the second user account and/or received from the first user account and adopted or approved by the second user. In various examples, based on receiving an indication of approval of the message, the message can be stored in association with one or more sent messages and/or messages to be sent associated with the second user account. In some examples, the message can be stored in association with the user account for a time period associated with the message. In such examples, the message can be stored for a limited time, and removed after expiration of the time period (e.g., absent receiving an approval thereof).

Based on a determination that the modification to the message is received ("Yes" at operation 606) the communication platform, at operation 610, stores a modified message in association with the second user account. In various examples, the communication platform can be configured to store the original message and/or the modified message. In some examples, the communication platform can be configured to store data associated with the modification(s), such as a timestamp and/or user account associated with each modification.

At operation 612, the communication platform determines whether an approval to send the message is received. In some examples, the approval to send the message can include an indication of approval or adoption of the message for publication in association with the second user account. In some examples, the approval to send the message can be based on a determination that a current time is associated with a publication time of an approved message (e.g., message that has been approved by the second user). In such examples, the approval is received based on the indication of approval received from the second user and the determination that the current time is associated with the publication time.

Based on a determination that the approval to send the message is not received ("No" at operation 612), the communication platform, continues to store the message or the modified message, as described above with regard to operation 608 and operation 610, respectively.

Based on a determination that the approval to send the message is received ("Yes" at operation 612), the communication platform, at operation 614, causes the message or the modified message to be published via a virtual space in association with the second user account. In at least one example, the message is published or posted to the virtual space with an indication that the message was published or posted by the second user. In various examples, the communication platform can identify the virtual space for publication based on data included in the request, such as a virtual space identifier associated therewith, and/or based on a virtual space identifier provided by the second user, such as in association with an approval of the message for publication in association with the second user account.

With regard to FIGS. 5 and 6, the order in which the operations are described is not intended to be construed as a limitation, and any number of the described operations may be combined in any order and/or in parallel to implement the processes. In some examples, one or more operations of the above-described methods may be omitted entirely. By way of example and not limitation, operations 502 and 504 can be performed without operations 506-520 and operations 602-608 can be performed without operation 610. Moreover, the methods described herein can be combined in whole or in part with each other or with other methods.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Example Clauses

A: A method comprising: A: A method comprising: receiving, from a first client associated with a sending user of a communication platform, a suggested message for publishing by a receiving user, wherein the suggested message includes a first identifier associated with the sending user, a second identifier associated with a receiving user account, and a third identifier associated with a first destination virtual space of the communication platform; and in response to receiving the suggested message, causing display of a first instance of the suggested message via a first user interface associated with the receiving user, wherein the suggested message is editable in the first user interface and the first user interface includes an approval affordance to publish the suggested message in the first destination virtual space of the communication platform; and in response to detecting a first indication of approval by the receiving user, causing display of the suggested message in the first destination virtual space of the communication platform, wherein the suggested message is published by the receiving user.

B: The method of paragraph A, further comprising: prior to causing display of the suggested message in the first destination virtual space, identifying a publication time associated with a publication of the suggested message via the first destination virtual space; and wherein causing display of the suggested message in the first destination virtual space of the communication platform is based on a determination that a current time is within a threshold time of the publication time.

C: The method of either paragraph A or paragraph B, further comprising: receiving, from a second client associated with a second user of the communication platform that is different from the sending user and the receiving user, a second suggested message comprising the second identifier and a fourth identifier associated with a second destination virtual space of the second suggested message; causing display, via the first user interface, of an instance of the second suggested message; receiving, via the first user interface, a second indication of approval of the second suggested message by the receiving user; and causing display of the second suggested message, in the second destination virtual space, in association with the receiving user.

D: The method of any one of paragraphs A-C, further comprising: prior to causing display of the suggested message in the first destination virtual space, receiving, via the first user interface and from the receiving user, a request to collaboratively edit the suggested message with the sending user; and causing a first editing interface to be presented in association with the first user interface and a second editing interface to be presented in association with a second user interface associated with the sending user, wherein the first editing interface and the second editing interface enable the receiving user and the sending user to edit at least a portion of the suggested message concurrently or asynchronously.

E: The method of paragraph D, further comprising: generating a communication instance between the receiving user and the sending user, wherein the communication instance is associated with a collaborative edit of the suggested message; causing a first communication interface associated with the communication instance to be presented in association with the first user interface and a second communication interface associated with the communication instance to be presented in association with the second user interface; and transmitting one or more communication instance messages between the first communication interface and the second communication interface during the collaborative edit.

F: The method of paragraph E, further comprising: identifying a third user that is associated with a tag linking a fourth identifier associated with the third user in the communication instance; and in response to identifying the third user, causing display of a third instance of the suggested message via a third user interface associated with the third user, wherein the third user interface includes the communication instance and the suggested message.

G: The method of any one of paragraphs A-F, further comprising in response to detecting one or more changes made by the receiving user to the suggested message, causing display of a second instance of the updated suggested message in a second user interface associated with the sending user, wherein the second user interface is different from the first user interface.

H: A system comprising: one or more processors; and one or more computer-readable media storing instructions that, when executed by the one or more processors, cause the system to perform operations comprising: receiving, from a first client associated with a sending user of a communication platform, a suggested message for publishing by a receiving user, wherein the suggested message includes a first identifier associated with the sending user, a second identifier associated with a receiving user account, and a third identifier associated with a first destination virtual space of the communication platform; and in response to receiving the suggested message, causing display of a first instance of the suggested message via a first user interface associated with the receiving user, wherein the suggested message is editable in the first user interface and the first user interface includes an approval affordance to publish the suggested message in the first destination virtual space of the communication platform; and in response to detecting a first indication of approval by the receiving user, causing display of the suggested message in the first destination virtual space of the communication platform, wherein the suggested message is published by the receiving user.

I: The system of paragraph H, the operations further comprising: prior to causing display of the suggested message in the first destination virtual space, identifying a publication time associated with a publication of the suggested message via the first destination virtual space; and wherein causing display of the suggested message in the first destination virtual space of the communication platform is based on a determination that a current time is within a threshold time of the publication time.

J: The system of either paragraph H or paragraph J, the operations further comprising: receiving, from a second client associated with a second user of the communication platform that is different from the sending user and the receiving user, a second suggested message comprising the second identifier and a fourth identifier associated with a second destination virtual space of the second suggested message; causing display, via the first user interface, of an instance of the second suggested message; receiving, via the first user interface, a second indication of approval of the second suggested message by the receiving user; and causing display of the second suggested message, in the second destination virtual space, in association with the receiving user.

K: The system of any one of paragraphs H-J, the operations further comprising: prior to causing display of the suggested message in the first destination virtual space, receiving, via the first user interface and from the receiving user, a request to collaboratively edit the suggested message with the sending user; and causing a first editing interface to be presented in association with the first user interface and a second editing interface to be presented in association with a second user interface associated with the sending user, wherein the first editing interface and the second editing interface enable the receiving user and the sending user to edit at least a portion of the suggested message concurrently or asynchronously.

L: The system of paragraph K, the operations further comprising: generating a communication instance between the receiving user and the sending user, wherein the communication instance is associated with a collaborative edit of the suggested message; causing a first communication interface associated with the communication instance to be presented in association with the first user interface and a second communication interface associated with the communication instance to be presented in association with the second user interface; and transmitting one or more communication instance messages between the first communication interface and the second communication interface during the collaborative edit.

M: The system of paragraph L, the operations further comprising: identifying a third user that is associated with a tag linking a fourth identifier associated with the third user in the communication instance; and in response to identifying the third user, causing display of a third instance of the suggested message via a third user interface associated with the third user, wherein the third user interface includes the communication instance and the suggested message.

N: The system of any one of paragraphs H-M, the operations further comprising further comprising in response to detecting one or more changes made by the receiving user to the suggested message, causing display of a second instance of the updated suggested message in a second user interface associated with the sending user, wherein the second user interface is different from the first user interface.

O: One or more non-transitory computer readable media storing instructions that, when executed, cause one or more processors to perform operations comprising: receiving, from a first client associated with a sending user of a communication platform, a suggested message for publishing by a receiving user, wherein the suggested message includes a first identifier associated with the sending user, a second identifier associated with a receiving user account, and a third identifier associated with a first destination virtual space of the communication platform; and in response to receiving the suggested message, causing display of a first instance of the suggested message via a first user interface associated with the receiving user, wherein the suggested message is editable in the first user interface and the first user interface includes an approval affordance to publish the suggested message in the first destination virtual space of the communication platform; and in response to detecting a first indication of approval by the receiving user, causing display of the suggested message in the first destination virtual space of the communication platform, wherein the suggested message is published by the receiving user.

P: The one or more non-transitory computer readable media of paragraph O, the operations further comprising: prior to causing display of the suggested message in the first destination virtual space, identifying a publication time associated with a publication of the suggested message via the first destination virtual space; and wherein causing display of the suggested message in the first destination virtual space of the communication platform is based on a determination that a current time is within a threshold time of the publication time.

Q: The one or more non-transitory computer readable media of either paragraph O or paragraph P, the operations further comprising: receiving, from a second client associated with a second user of the communication platform that is different from the sending user and the receiving user, a second suggested message comprising the second identifier and a fourth identifier associated with a second destination virtual space of the second suggested message; causing display, via the first user interface, of an instance of the second suggested message; receiving, via the first user interface, a second indication of approval of the second suggested message by the receiving user; and causing display of the second suggested message, in the second destination virtual space, in association with the receiving user.

R: The one or more non-transitory computer readable media of any one of paragraphs O-Q, the operations further comprising: prior to causing display of the suggested message in the first destination virtual space, receiving, via the first user interface and from the receiving user, a request to collaboratively edit the suggested message with the sending user; and causing a first editing interface to be presented in association with the first user interface and a second editing interface to be presented in association with a second user interface associated with the sending user, wherein the first editing interface and the second editing interface enable the receiving user and the sending user to edit at least a portion of the suggested message concurrently or asynchronously.

S: The one or more non-transitory computer readable media of paragraph R, the operations further comprising: generating a communication instance between the receiving user and the sending user, wherein the communication instance is associated with a collaborative edit of the suggested message; causing a first communication interface associated with the communication instance to be presented in association with the first user interface and a second communication interface associated with the communication instance to be presented in association with the second user interface; and transmitting one or more communication instance messages between the first communication interface and the second communication interface during the collaborative edit.

T: The one or more non-transitory computer readable media of paragraph S, the operations further comprising: identifying a third user that is associated with a tag linking a fourth identifier associated with the third user in the communication instance; and in response to identifying the third user, causing display of a third instance of the suggested message via a third user interface associated with the third user, wherein the third user interface includes the communication instance and the suggested message.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

What is claimed is:
1. A method comprising:
receiving, from a first client associated with a sending user of a communication platform and via first instance of a first user interface of the communication platform, a suggested message for publishing by a receiving user, wherein the suggested message includes a first identifier associated with the sending user, a second identifier associated with a receiving user account, and a third identifier associated with a first destination virtual space of the communication platform in which the suggested message is to be published and that is identified by the sending user via the first instance of the first user interface; and
in response to receiving the suggested message,
causing display of the suggested message via a second user interface associated with the receiving user, wherein the suggested message is editable in the second user interface, the second user interface includes an approval affordance to publish the suggested message in the first destination virtual space of the communication platform, and the sending user or the receiving user identifies a publication time at which the suggested message is to be published within the first destination virtual space;

determining a threshold duration of time subsequent to the publication time at which the suggested message is to be published within the first destination virtual space; and in response to detecting a first indication of approval by the receiving user and based at least in part on a determination that the first indication of approval is at or after the publication time and prior to the threshold duration of time, causing display of the suggested message in the first destination virtual space of the communication platform, wherein the suggested message is published by the receiving user.

2. The method of claim 1, further comprising:
prior to causing display of the suggested message in the first destination virtual space, identifying the publication time associated with a publication of the suggested message via the first destination virtual space; and
wherein causing display of the suggested message in the first destination virtual space of the communication platform is based on a second determination that a current time is within the threshold duration of time of the publication time.

3. The method of claim 1, further comprising:
receiving, from a second client associated with a second user of the communication platform that is different from the sending user and the receiving user, a second suggested message comprising the second identifier and a fourth identifier associated with a second destination virtual space of the second suggested message;
causing display, via the second user interface, of a second instance of the second suggested message;
receiving, via the second user interface, a second indication of approval of the second suggested message by the receiving user; and
causing display of the second suggested message, in the second destination virtual space, in association with the receiving user.

4. The method of claim 1, further comprising:
prior to causing display of the suggested message in the first destination virtual space, receiving, via the second user interface and from the receiving user, a request to collaboratively edit the suggested message with the sending user; and
causing a first editing interface to be presented in association with the first user interface and a second editing interface to be presented in association with the second user interface, wherein the first editing interface and the second editing interface enable the receiving user and the sending user to edit at least a portion of the suggested message concurrently or asynchronously.

5. The method of claim 4, further comprising:
generating a communication instance between the receiving user and the sending user, wherein the communication instance is associated with a collaborative edit of the suggested message;
causing a first communication interface associated with the communication instance to be presented in association with the first user interface and a second communication interface associated with the communication instance to be presented in association with the second user interface; and
transmitting one or more communication instance messages between the first communication interface and the second communication interface during the collaborative edit.

6. The method of claim 5, further comprising:
identifying a third user that is associated with a tag linking a fourth identifier associated with the third user in the communication instance; and
in response to identifying the third user, causing display of a second instance of the suggested message via a third user interface associated with the third user, wherein the third user interface includes the communication instance and the suggested message.

7. The method of claim 1, further comprising in response to detecting one or more changes made by the receiving user to the suggested message, causing display of a second instance of an updated suggested message in a third user interface associated with the sending user, wherein the third user interface is different from the first user interface.

8. A system comprising:
one or more processors; and
one or more computer-readable media storing instructions that, when executed by the one or more processors, cause the system to perform operations comprising:
receiving, from a first client associated with a sending user of a communication platform and via first instance of a first user interface of the communication platform, a suggested message for publishing by a receiving user, wherein the suggested message includes a first identifier associated with the sending user, a second identifier associated with a receiving user account, and a third identifier associated with a first destination virtual space of the communication platform in which the suggested message is to be published and that is identified by the sending user via the first instance of the first user interface; and
in response to receiving the suggested message,
causing display of the suggested message via a second user interface associated with the receiving user, wherein the suggested message is editable in the second user interface, the second user interface includes an approval affordance to publish the suggested message in the first destination virtual space of the communication platform, and the sending user or the receiving user identifies a publication time at which the suggested message is to be published within the first destination virtual space;
determining a threshold duration of time subsequent to the publication time at which the suggested message is to be published within the first destination virtual space; and
in response to detecting a first indication of approval by the receiving user and based at least in part on a determination that the first indication of approval is at or after the publication time and prior to the threshold duration of time, causing display of the suggested message in the first destination virtual space of the communication platform, wherein the suggested message is published by the receiving user.

9. The system of claim 8, the operations further comprising:
prior to causing display of the suggested message in the first destination virtual space, identifying the publication time associated with a publication of the suggested message via the first destination virtual space; and
wherein causing display of the suggested message in the first destination virtual space of the communication platform is based on a second determination that a current time is within the threshold duration of time of the publication time.

10. The system of claim 8, the operations further comprising:
receiving, from a second client associated with a second user of the communication platform that is different from the sending user and the receiving user, a second suggested message comprising the second identifier and a fourth identifier associated with a second destination virtual space of the second suggested message;
causing display, via the second user interface, of a second instance of the second suggested message;
receiving, via the second user interface, a second indication of approval of the second suggested message by the receiving user; and
causing display of the second suggested message, in the second destination virtual space, in association with the receiving user.

11. The system of claim 8, the operations further comprising:
prior to causing display of the suggested message in the first destination virtual space, receiving, via the second user interface and from the receiving user, a request to collaboratively edit the suggested message with the sending user; and
causing a first editing interface to be presented in association with the first user interface and a second editing interface to be presented in association with the second user interface, wherein the first editing interface and the second editing interface enable the receiving user and the sending user to edit at least a portion of the suggested message concurrently or asynchronously.

12. The system of claim 11, the operations further comprising:
generating a communication instance between the receiving user and the sending user, wherein the communication instance is associated with a collaborative edit of the suggested message;
causing a first communication interface associated with the communication instance to be presented in association with the first user interface and a second communication interface associated with the communication instance to be presented in association with the second user interface; and
transmitting one or more communication instance messages between the first communication interface and the second communication interface during the collaborative edit.

13. The system of claim 12, the operations further comprising:
identifying a third user that is associated with a tag linking a fourth identifier associated with the third user in the communication instance; and
in response to identifying the third user, causing display of a second instance of the suggested message via a third user interface associated with the third user, wherein the third user interface includes the communication instance and the suggested message.

14. The system of claim 8, the operations further comprising further comprising in response to detecting one or more changes made by the receiving user to the suggested message, causing display of a second instance of an updated suggested message in a third user interface associated with the sending user, wherein the third user interface is different from the first user interface.

15. One or more non-transitory computer readable media storing instructions that, when executed, cause one or more processors to perform operations comprising:
receiving, from a first client associated with a sending user of a communication platform and via first instance of a first user interface of the communication platform, a suggested message for publishing by a receiving user, wherein the suggested message includes a first identifier associated with the sending user, a second identifier associated with a receiving user account, and a third identifier associated with a first destination virtual space of the communication platform in which the suggested message is to be published and that is identified by the sending user via the first instance of the first user interface; and
in response to receiving the suggested message,
causing display of the suggested message via a second user interface associated with the receiving user, wherein the suggested message is editable in the second user interface, the second user interface includes an approval affordance to publish the suggested message in the first destination virtual space of the communication platform, and the sending user or the receiving user identifies a publication time at which the suggested message is to be published within the first destination virtual space;
determining a threshold duration of time subsequent to the publication time at which the suggested message is to be published within the first destination virtual space; and
in response to detecting a first indication of approval by the receiving user and based at least in part on a determination that the first indication of approval is at or after the publication time and prior to the threshold duration of time, causing display of the suggested message in the first destination virtual space of the communication platform, wherein the suggested message is published by the receiving user.

16. The one or more non-transitory computer readable media of claim 15, the operations further comprising:
prior to causing display of the suggested message in the first destination virtual space, identifying the publication time associated with a publication of the suggested message via the first destination virtual space; and
wherein causing display of the suggested message in the first destination virtual space of the communication platform is based on a second determination that a current time is within the threshold duration of time of the publication time.

17. The one or more non-transitory computer readable media of claim 15, the operations further comprising:
receiving, from a second client associated with a second user of the communication platform that is different from the sending user and the receiving user, a second suggested message comprising the second identifier and a fourth identifier associated with a second destination virtual space of the second suggested message;
causing display, via the second user interface, of a second instance of the second suggested message;
receiving, via the second user interface, a second indication of approval of the second suggested message by the receiving user; and
causing display of the second suggested message, in the second destination virtual space, in association with the receiving user.

18. The one or more non-transitory computer readable media of claim 15, the operations further comprising:

prior to causing display of the suggested message in the first destination virtual space, receiving, via the first user interface and from the receiving user, a request to collaboratively edit the suggested message with the sending user; and causing a first editing interface to be presented in association with the first user interface and a second editing interface to be presented in association with the second user interface, wherein the first editing interface and the second editing interface enable the receiving user and the sending user to edit at least a portion of the suggested message concurrently or asynchronously.

19. The one or more non-transitory computer readable media of claim 18, the operations further comprising:

generating a communication instance between the receiving user and the sending user, wherein the communication instance is associated with a collaborative edit of the suggested message;

causing a first communication interface associated with the communication instance to be presented in association with the first user interface and a second communication interface associated with the communication instance to be presented in association with the second user interface; and transmitting one or more communication instance messages between the first communication interface and the second communication interface during the collaborative edit.

20. The one or more non-transitory computer readable media of claim 19, the operations further comprising:

identifying a third user that is associated with a tag linking a fourth identifier associated with the third user in the communication instance; and in response to identifying the third user, causing display of a second instance of the suggested message via a third user interface associated with the third user, wherein the third user interface includes the communication instance and the suggested message.

\* \* \* \* \*